Figure 10:
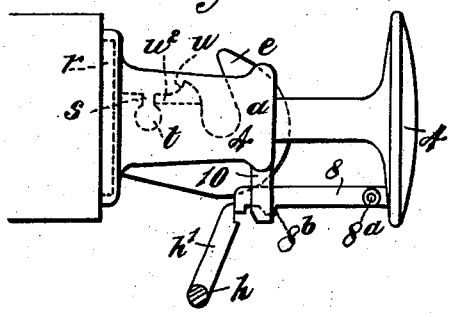

No. 702,563. Patented June 17, 1902.
W. R. S. JONES.
RAILWAY COUPLING APPARATUS.
(Application filed Mar. 15, 1902.)
(No Model.) 17 Sheets—Sheet 1.
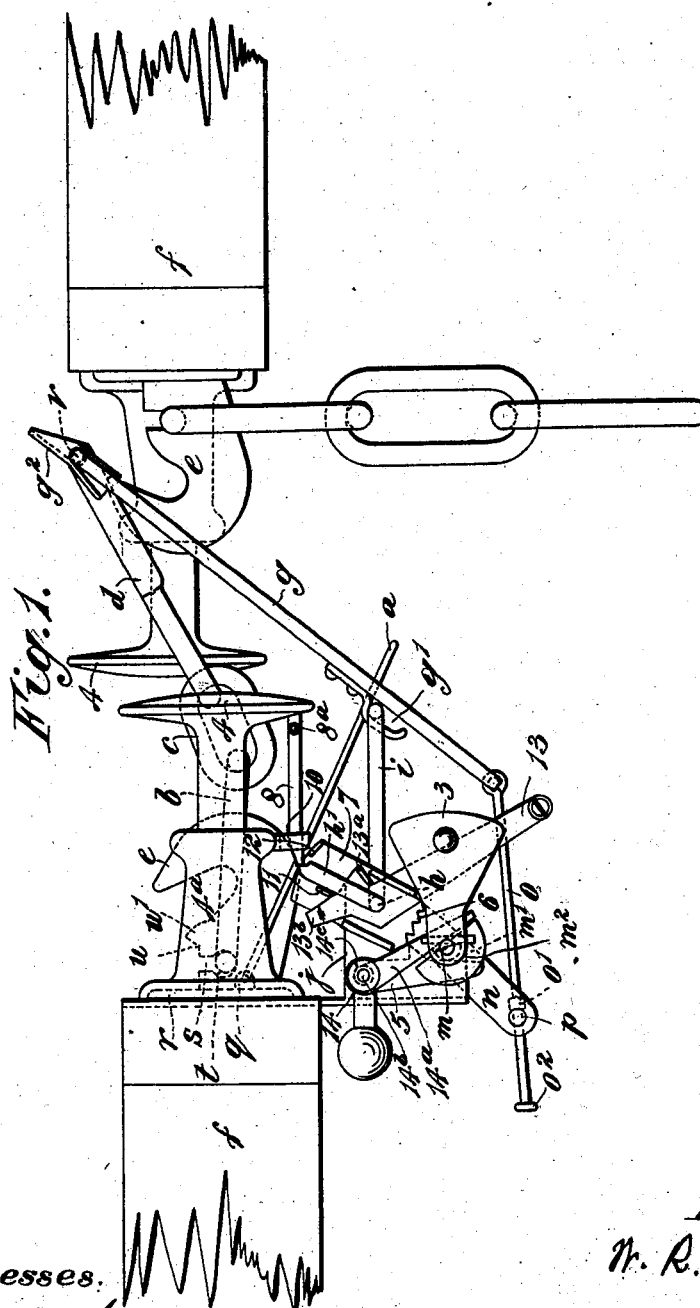
Witnesses.
Geo. E. Puch.
E. R. Peek
Inventor.
W. R. S. Jones
by Hubert E. Peek
atty

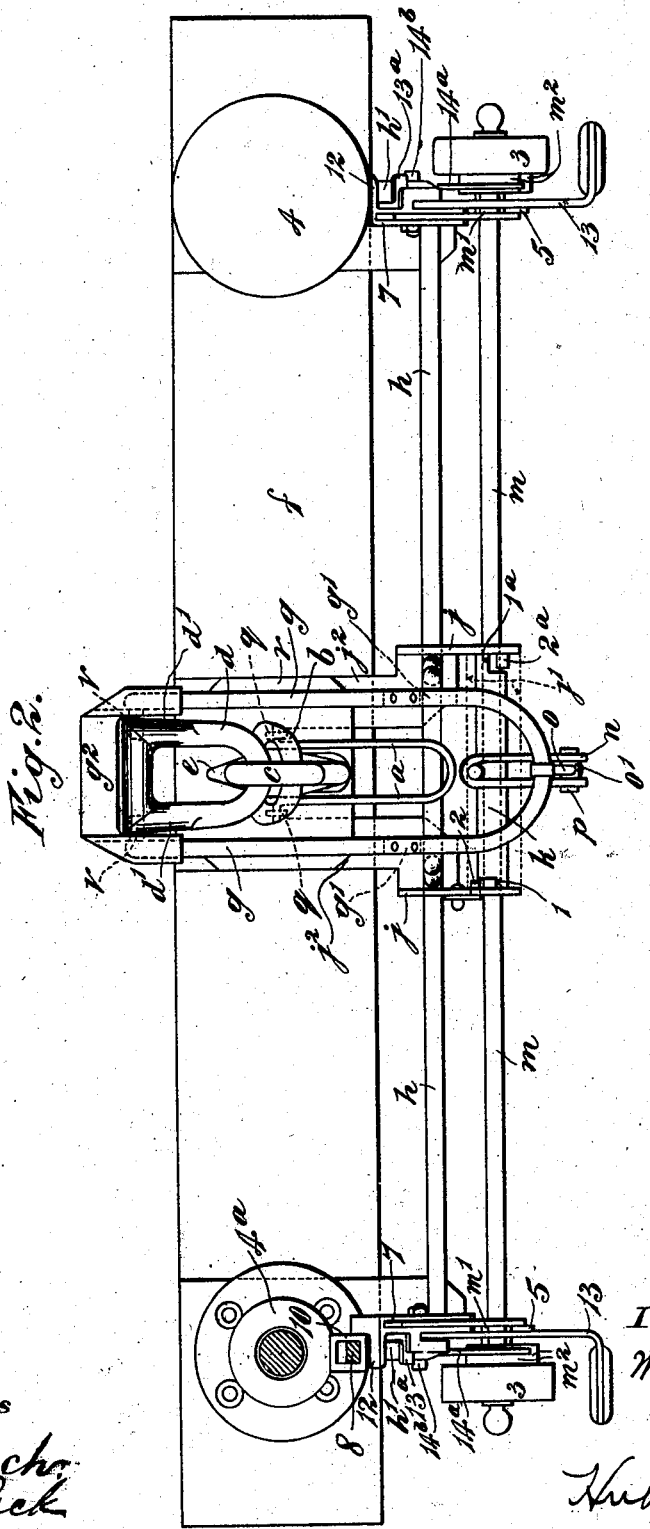

No. 702,563. Patented June 17, 1902.
W. R. S. JONES.
RAILWAY COUPLING APPARATUS.
(Application filed Mar. 15, 1902.)
(No Model.) 17 Sheets—Sheet 3.
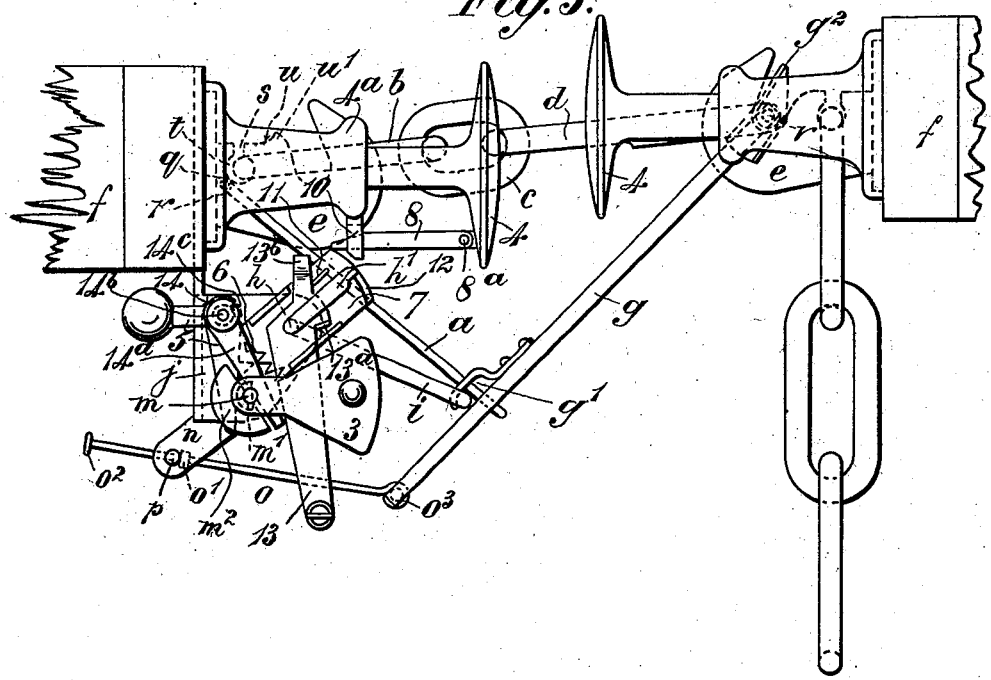
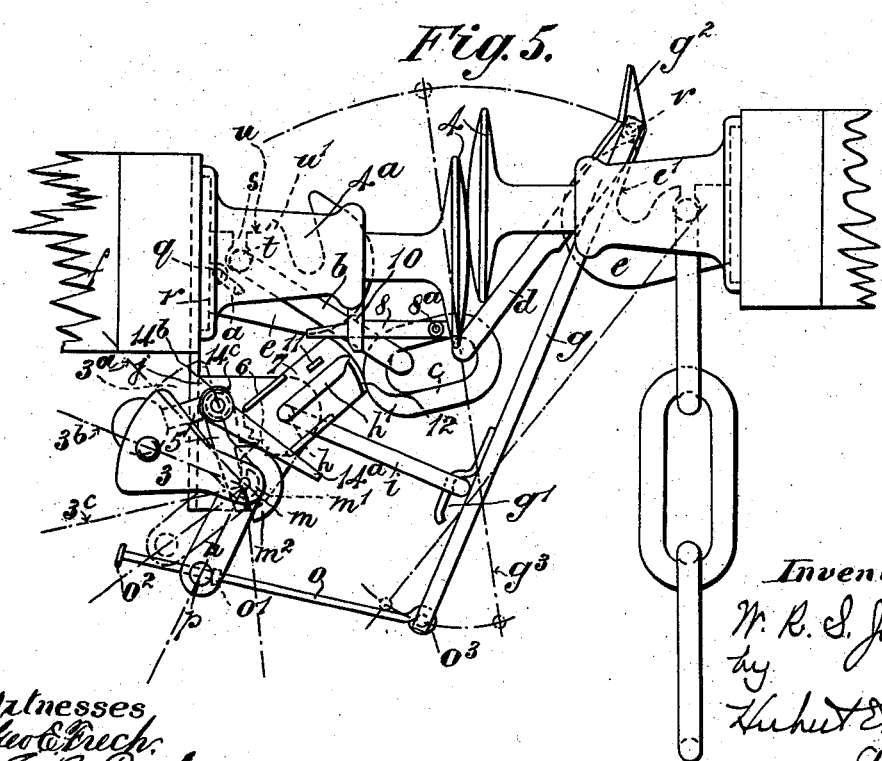
Witnesses
Geo. E. Trech.
E. R. Peck
Inventor:
W. R. S. Jones
by
Hubert E. Peck
atty No. 702,563. Patented June 17, 1902.
W. R. S. JONES.
RAILWAY COUPLING APPARATUS.
(Application filed Mar. 15, 1902.)
(No Model.) 17 Sheets—Sheet 4.
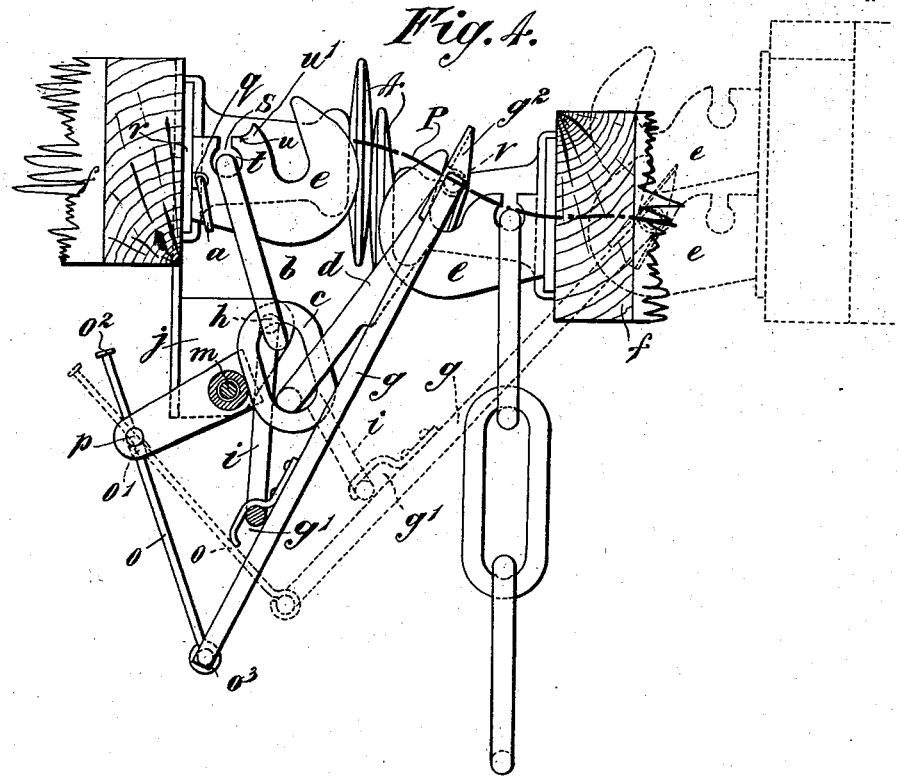
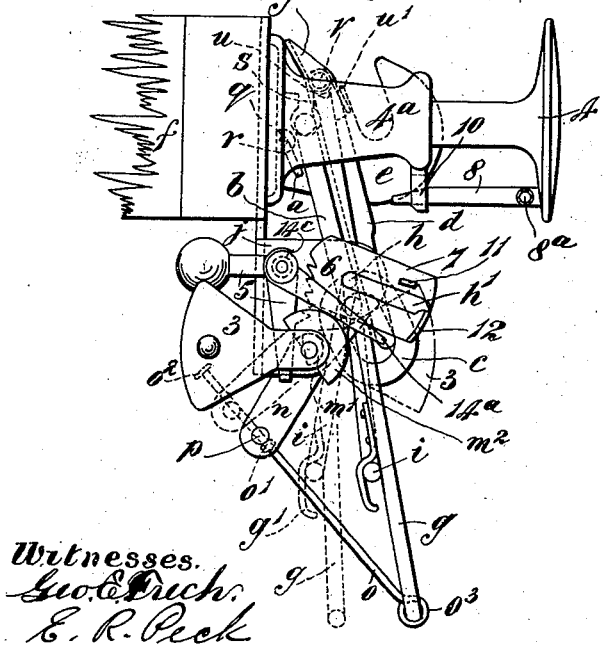

No. 702,563. Patented June 17, 1902.
W. R. S. JONES.
RAILWAY COUPLING APPARATUS.
(Application filed Mar. 15, 1902.)
(No Model.) 17 Sheets—Sheet 5.
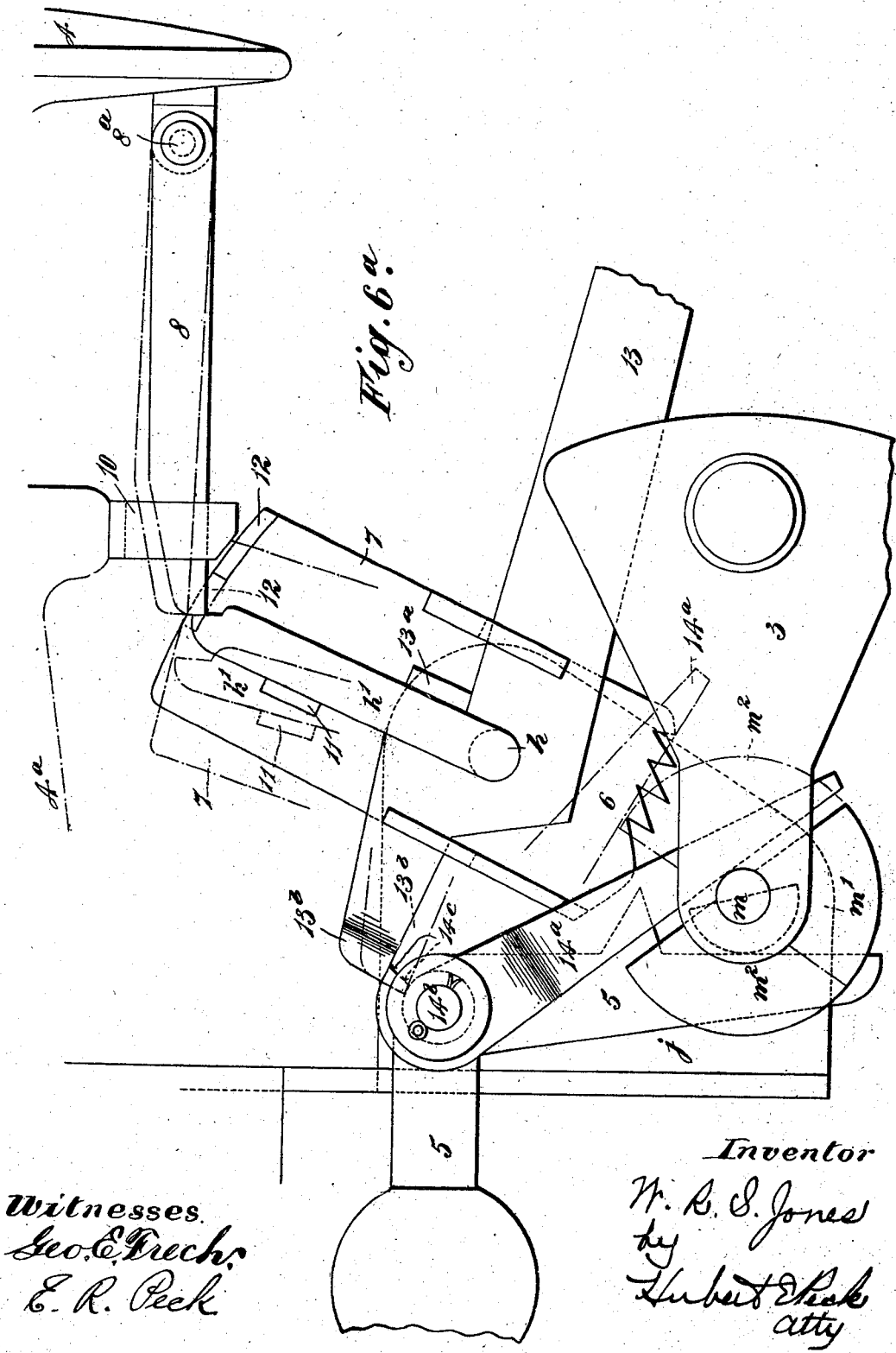

No. 702,563.  
W. R. S. JONES.  
RAILWAY COUPLING APPARATUS.  
(Application filed Mar. 15, 1902.)
Patented June 17, 1902.
(No Model.)
17 Sheets—Sheet 6.
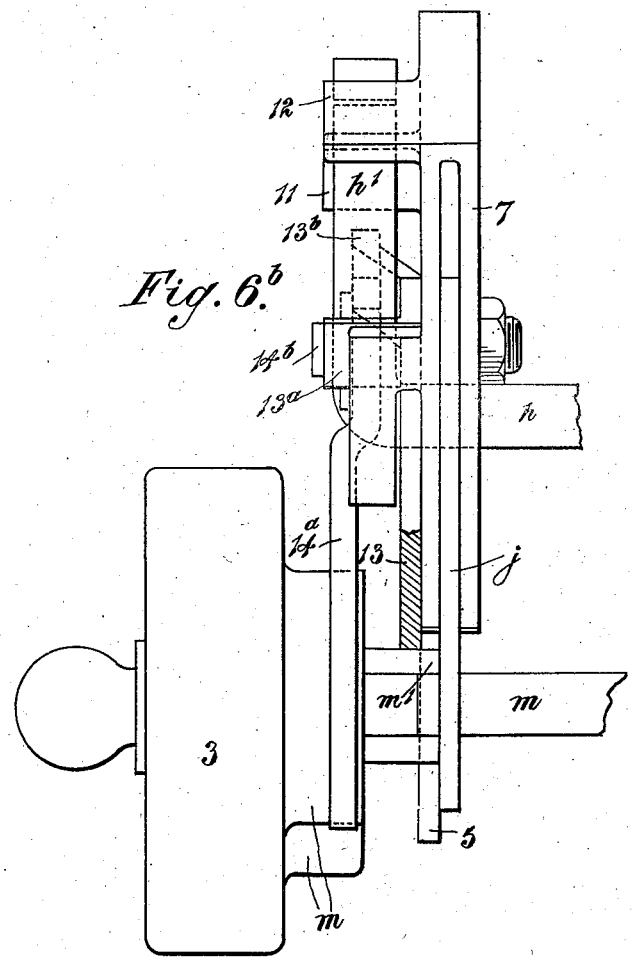
Witnesses.  
Geo. E. Drech.  
E. R. Peck.
Inventor  
W. R. S. Jones  
by  
Hubert E. Peck  
atty No. 702,563. Patented June 17, 1902.
W. R. S. JONES.
RAILWAY COUPLING APPARATUS.
(Application filed Mar. 15, 1902.)
(No Model.) 17 Sheets—Sheet 7.
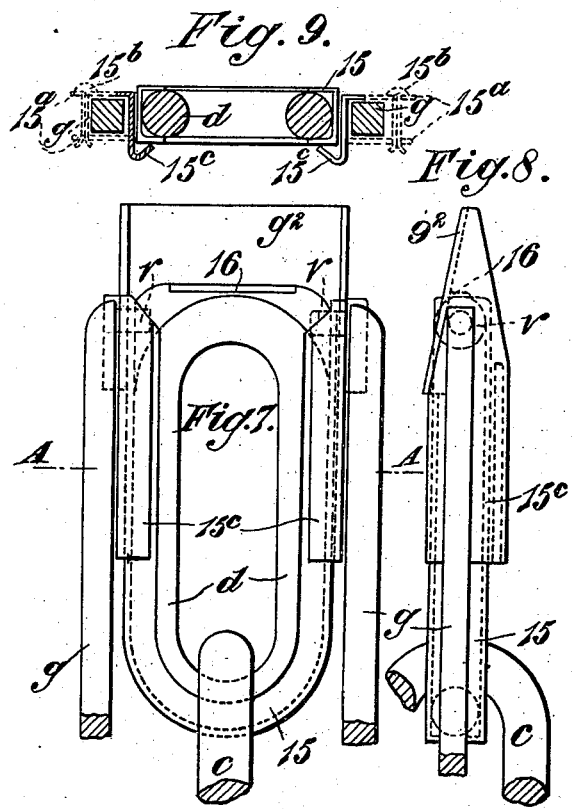
Witnesses.
Geo. E. Fuch,
E. R. Peck
Inventor
W. R. S. Jones
by Hubert Peck
Atty No. 702,563.

W. R. S. JONES.
RAILWAY COUPLING APPARATUS.
(Application filed Mar. 15, 1902.)

Patented June 17, 1902.

(No Model.)

17 Sheets—Sheet 8.

Witnesses
Geo. E. Frech
E. R. Peck

Inventor
W. R. S. Jones
by
Hubert E. Peck
atty

No. 702,563.  
W. R. S. JONES.  
RAILWAY COUPLING APPARATUS.  
(Application filed Mar. 15, 1902.)  
Patented June 17, 1902.

(No Model.)

17 Sheets—Sheet 9.

No. 702,563. Patented June 17, 1902.
W. R. S. JONES.
RAILWAY COUPLING APPARATUS.
(Application filed Mar. 15, 1902.)
(No Model.) 17 Sheets—Sheet 10.

Witnesses
Geo. E. Frech
E. R. Peck

Inventor
W. R. S. Jones
by Hubert E. Peck
atty

No. 702,563. Patented June 17, 1902.
W. R. S. JONES.
RAILWAY COUPLING APPARATUS.
(Application filed Mar. 15, 1902.)
(No Model.) 17 Sheets—Sheet 11.
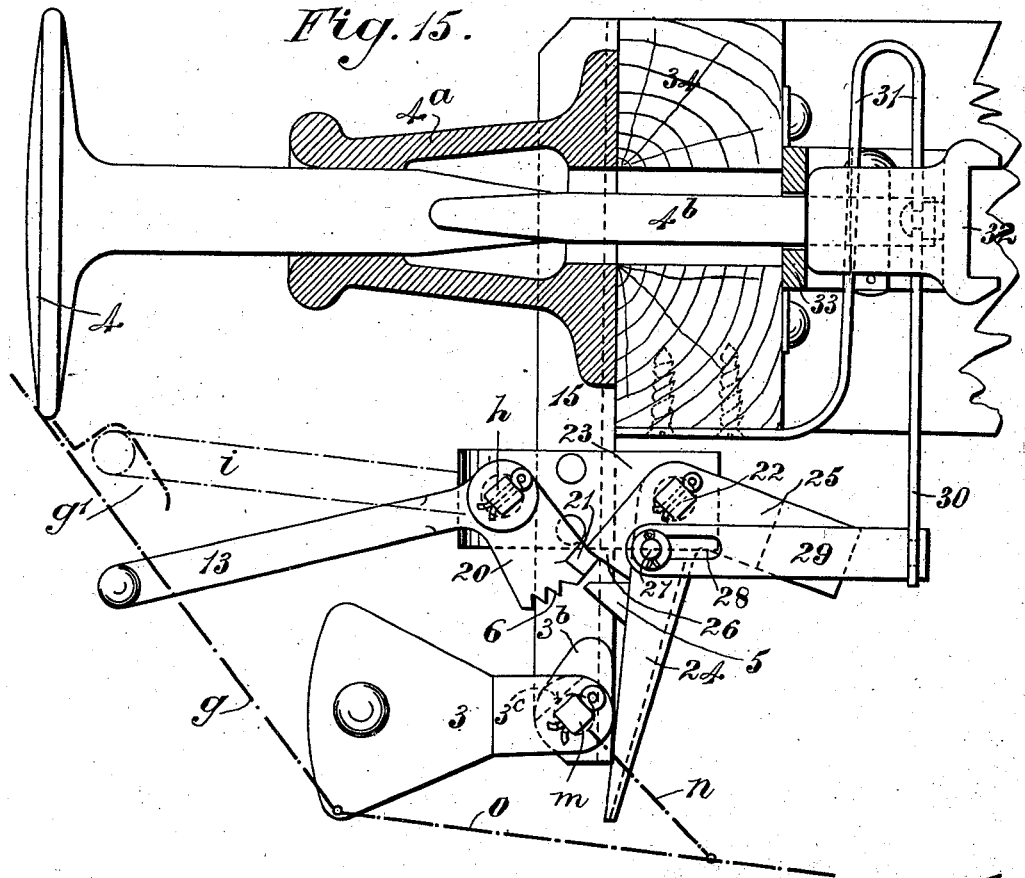
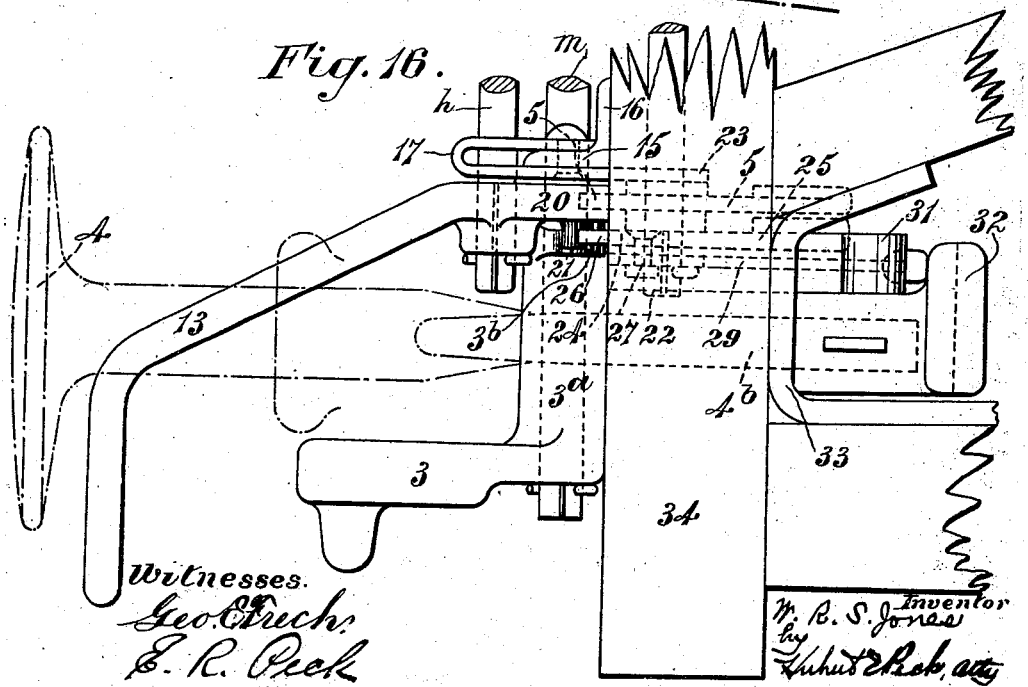
Witnesses.
Geo. Church.
E. R. Peck.
Inventor
W. R. S. Jones
by
Luther Peck, atty No. 702,563.  
W. R. S. JONES.  
RAILWAY COUPLING APPARATUS.  
(Application filed Mar. 15, 1902.)  
Patented June 17, 1902.
(No Model.)  
17 Sheets—Sheet 12.
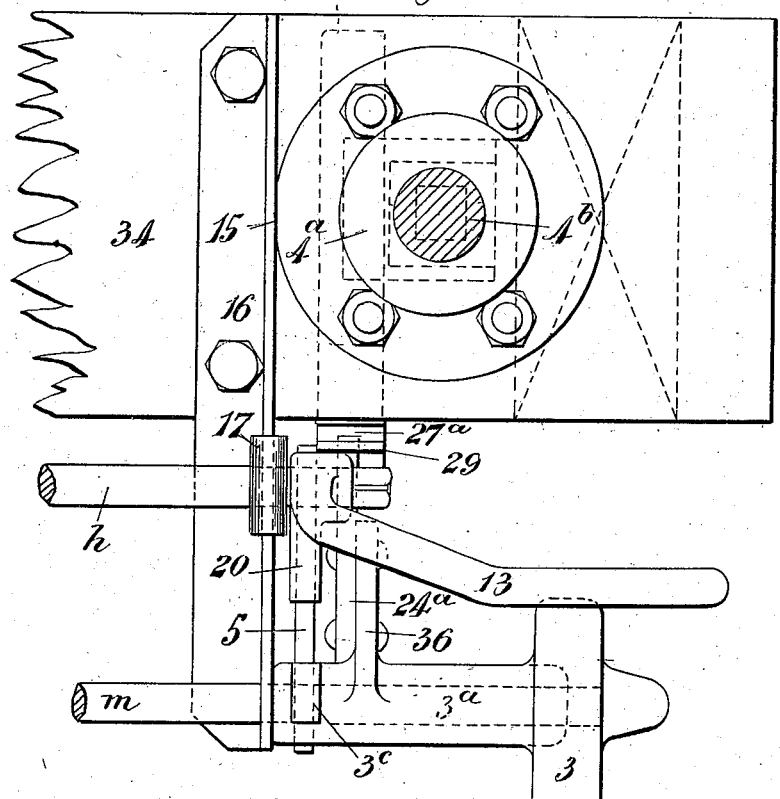
Fig. 17.
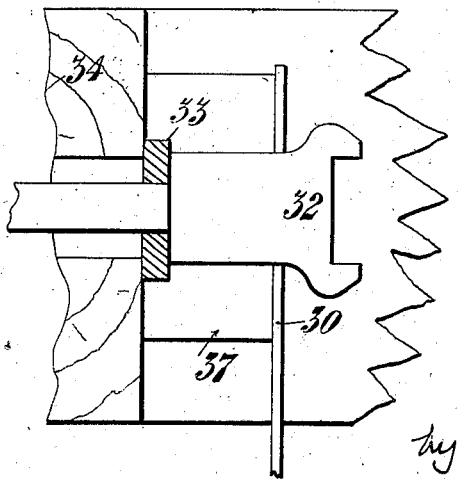
Fig. 18ª.
Witnesses.  
Geo. E. Frech.  
E. R. Peck.
Inventor.  
W. R. S. Jones  
by Hubert Howk  
Atty No. 702,563. Patented June 17, 1902.
W. R. S. JONES.
RAILWAY COUPLING APPARATUS.
(Application filed Mar. 15, 1902.)
(No Model.) 17 Sheets—Sheet 13.

Witnesses
Geo. E. Frech.
E. R. Peck.

Inventor.
W. R. S. Jones
by Hubert E. Peck
atty

No. 702,563. Patented June 17, 1902.
W. R. S. JONES.
RAILWAY COUPLING APPARATUS.
(Application filed Mar. 15, 1902.)

(No Model.) 17 Sheets—Sheet 14.

Witnesses.
Geo. E. Peck.
Emily R. Peck.

Inventor
W. R. S. Jones
by Hubert E. Peck
atty

No. 702,563. Patented June 17, 1902.
W. R. S. JONES.
RAILWAY COUPLING APPARATUS.
(Application filed Mar. 15, 1902.)
(No Model.) 17 Sheets—Sheet 15.

Witnesses.
Geo. E. Fuch.
Emily R. Peck.

Inventor
W. R. S. Jones
by Hubert Peak
atty

No. 702,563. Patented June 17, 1902.
W. R. S. JONES.
RAILWAY COUPLING APPARATUS.
(Application filed Mar. 15, 1902.)

(No Model.) 17 Sheets—Sheet 16.

Witnesses
Geo. E. Frech.
E. R. Peck

Inventor
W. R. S. Jones
by Hubert E. Peck
Atty

No. 702,563. Patented June 17, 1902.
W. R. S. JONES.
RAILWAY COUPLING APPARATUS.
(Application filed Mar. 15, 1902.)
(No Model.) 17 Sheets—Sheet 17.

UNITED STATES PATENT OFFICE.

WILLIAM RICHARD SUMPTION JONES, OF LONDON, ENGLAND.

RAILWAY COUPLING APPARATUS.

SPECIFICATION forming part of Letters Patent No. 702,563, dated June 17, 1902.

Application filed March 15, 1902. Serial No. 98,407. (No model.)

*To all whom it may concern:*

Be it known that I, WILLIAM RICHARD SUMPTION JONES, a subject of the King of Great Britain and Ireland, residing at Whitehall, London, England, have invented Improvements in Railway Coupling Apparatus, of which the following is a specification.

This invention has reference to improvements in that type of railway coupling apparatus for coupling vehicles having side buffers wherein the coupling or uncoupling of one vehicle to or from another is effected by means of a central coupling-chain, one end link of which or its equivalent is attached to the draw-hook of one vehicle and the other end link of which is adapted to be lifted onto or from the draw-hook of an adjacent vehicle by operating mechanism adapted to be worked from either side of the vehicle.

One object of my invention is to provide means whereby the inward motion of one or both of the buffers on the vehicle will automatically cause the link to be placed on the hook of the other vehicle.

Another object of the invention is to provide means whereby the link connected to one vehicle may be automatically raised out of the hook of the other vehicle on the loosening of the coupling-chain.

A further object of the invention is to provide means in the above-referred-to construction whereby the vehicles may be non-automatically coupled or uncoupled.

With these objects in view and others my invention includes the construction and arrangement of parts, either separately or in combination, as will be described hereinafter with reference to the accompanying drawings and then particularly pointed out in the claims.

Figure 11:
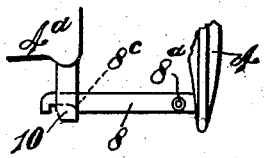
Figure 12:
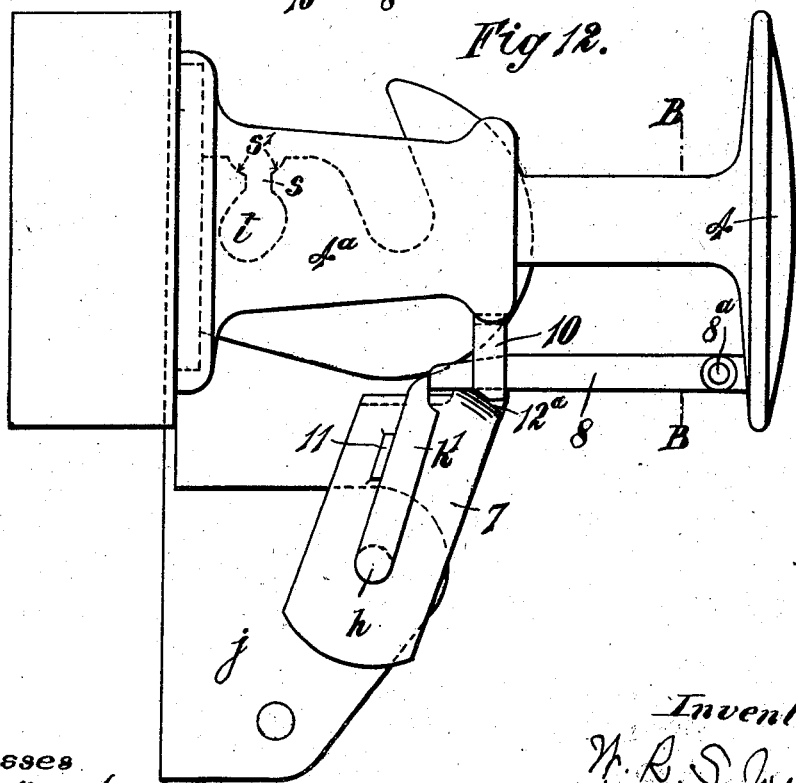
Figure 13:
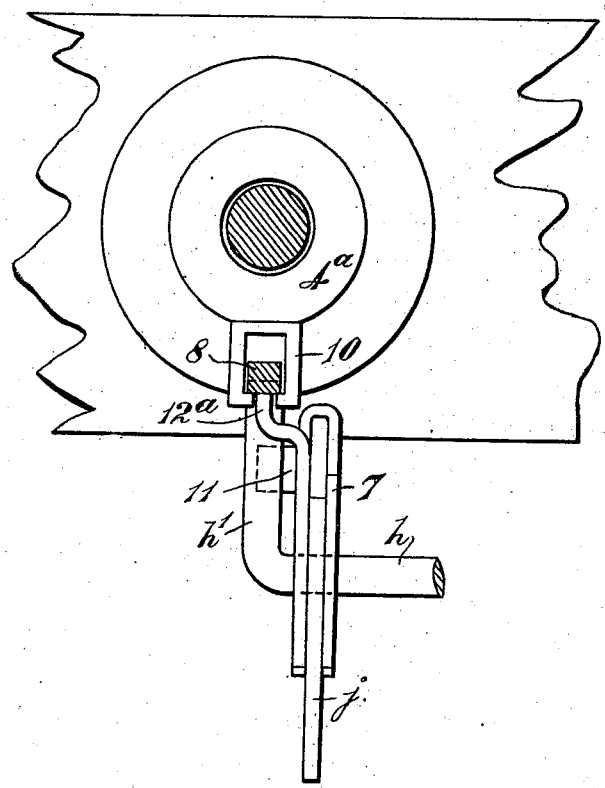
Figure 14:
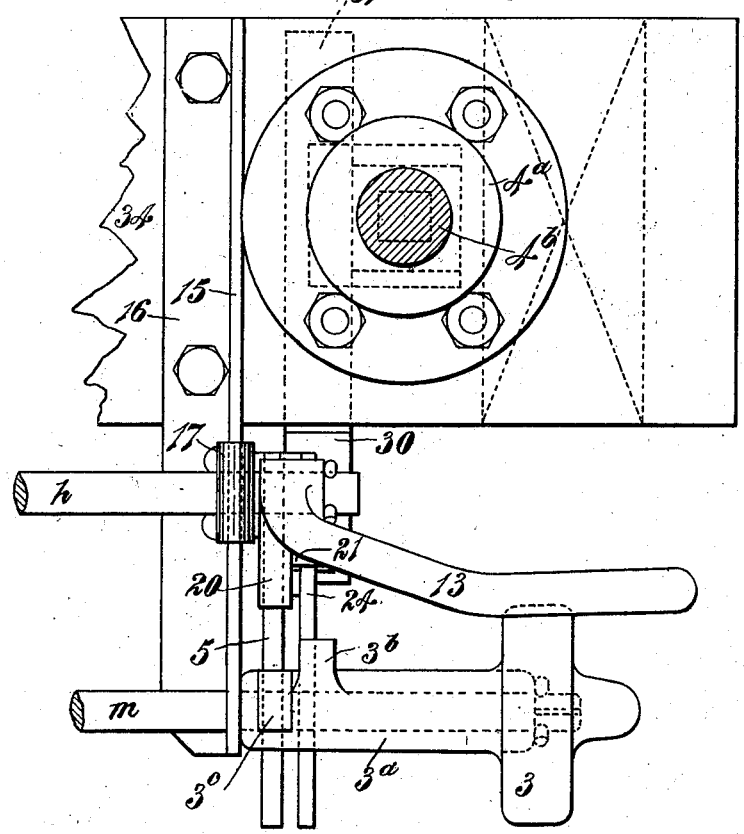
Figure 18:
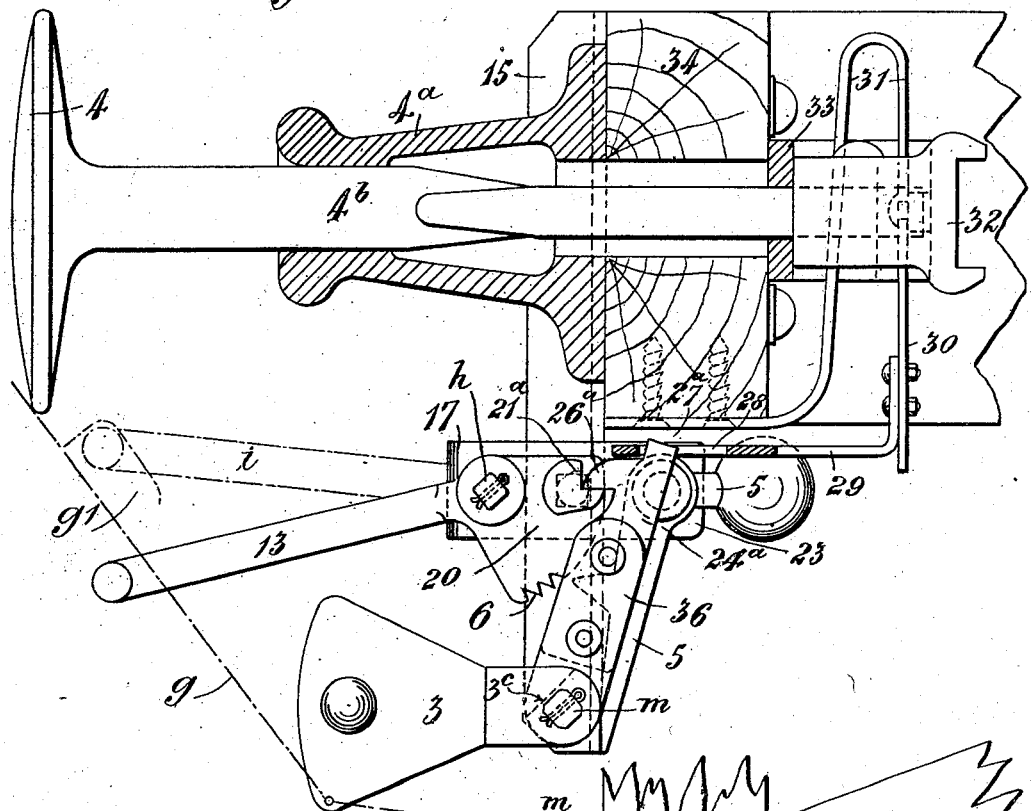
Figure 19:
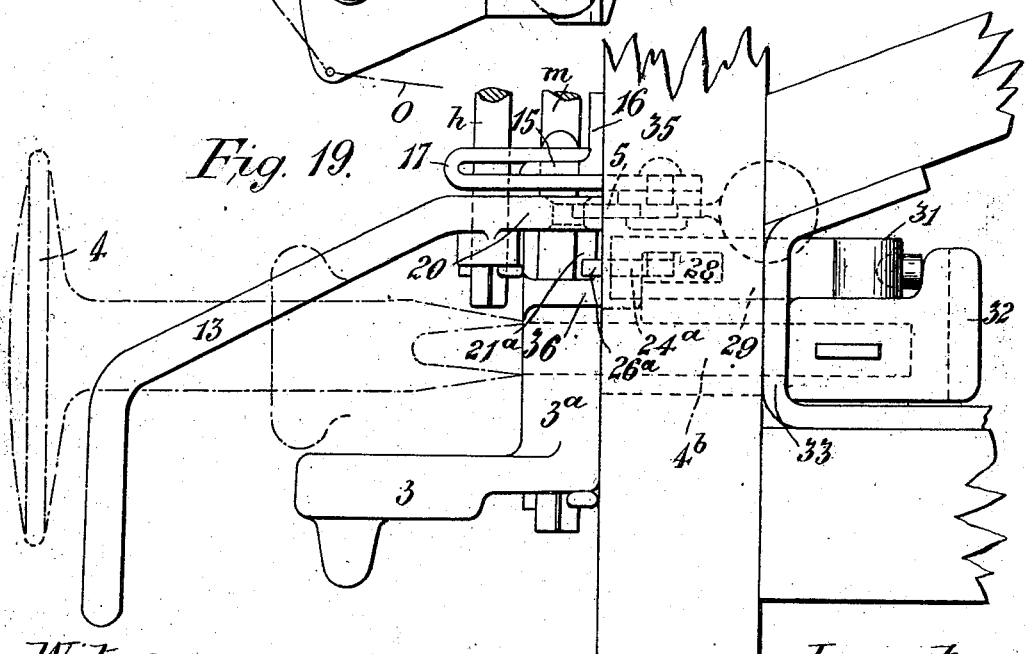
Figure 20:
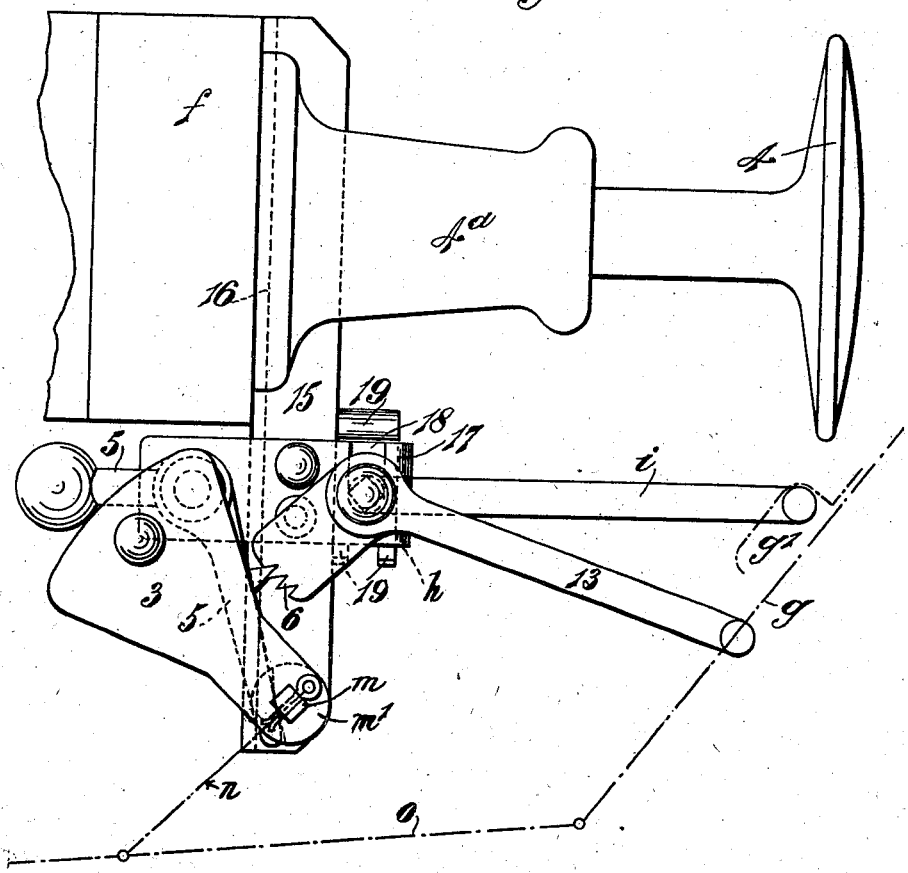
Figure 22:
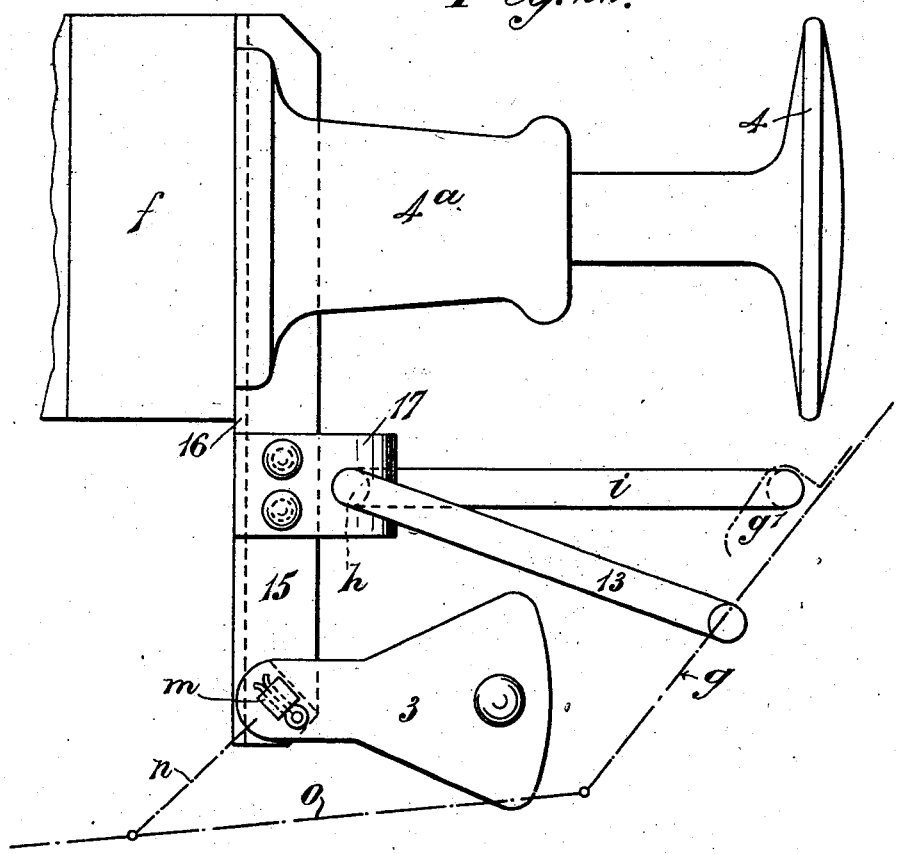
Figure 23:
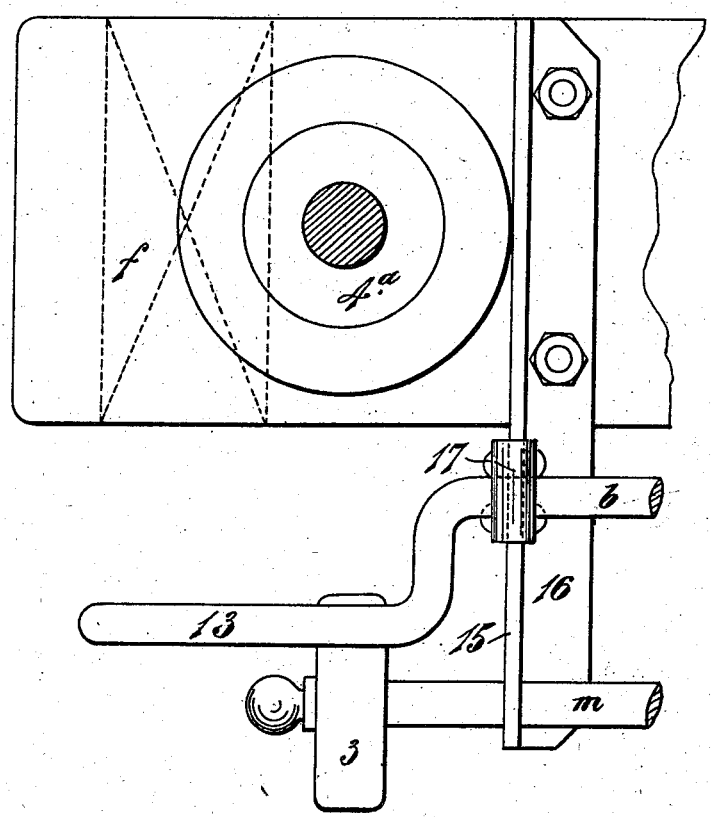

In the accompanying illustrative drawings, Figure 1 shows in side elevation the adjacent ends of two railway-vehicles, one of which is provided with automatic coupling apparatus adapted to fulfil all the functions hereinbefore referred to. The said apparatus is shown held in the operative or coupling position, ready to become automatically engaged with the drawhook of the other vehicle, which is shown unprovided with automatic coupling apparatus. Fig. 2 shows in end elevation one of the vehicles with the automatic coupling apparatus thereon held in the same position as in Fig. 1 and with one of the buffer-heads removed to show other parts more clearly. Fig. 3 is a similar view to Fig. 1, but showing the two vehicles coupled and one pulling on the other. Fig. 4 shows, partly in side elevation and partly in longitudinal section, how two coupled vehicles whose draw-hooks may be at different heights can be pressed fully together without the coupling-chain becoming accidentally uncoupled. The said figure also shows by means of a thick dotted line the path in which the center of the joint between the coupling-link and the link-carrier moves when the operating parts of the coupling apparatus are in the positions indicated, thus showing that it is then impossible for the coupling apparatus to become accidentally uncoupled. Fig. 5 is a similar view to Fig. 3, but showing the apparatus in the act of being automatically moved into the uncoupling position by movement of the two vehicles together. Fig. 6 shows in full lines the position which the parts of the apparatus automatically assume at the end of the uncoupling operation, the dotted lines showing the position of the principal parts of the apparatus when moved into the lowest inoperative position. Figs. 6$^a$ and 6$^b$ are side and end elevations showing parts of the apparatus to a larger scale than Figs. 1 to 6, inclusive. Figs. 7 and 8 are elevations at right angles to one another, and Fig. 9 a section on the line A A of Fig. 7, showing to a larger scale than Figs. 1 to 6, inclusive, another form of coupling-link with link-carrier therefor. Figs. 10 and 11 are side elevations showing modified details. Fig. 12 is a side elevation, and Fig. 13 a section on the line B B of Fig. 12, showing a further-modified detail. Fig. 14 is a part end elevation with the buffer-rod in section; Fig. 15, a side elevation with the buffer-case and head-stock in longitudinal section, and Fig. 16 a part plan showing a modified construction of coupling apparatus according to this invention. Figs. 17, 18, and 19 are similar views to Figs. 14, 15, and 16, respectively, showing a further-modified construction of coupling apparatus according to this invention. Fig. 18$^a$ is a detail view showing a modification. Fig. 20 is a part side elevation, and Fig. 21 a part end elevation with the buffer-rod in section, showing how the construction of the coupling apparatus can be simplified when such apparatus is designed for non-automatic coupling and uncoupling and for automatic uncoupling, but not for automatic coupling. Figs. 22 and 23 are similar views to Figs. 20 and 21, respectively, showing how the construction of the coupling apparatus can be further simplified when such apparatus is designed for non-automatic coupling and uncoupling, but not for automatic coupling or automatic uncoupling.

Referring to Figs. 1 to 6$^b$, inclusive, $a$ is a pivoted support for the inner link $b$ of the coupling-chain, which is composed of three links $b$ $c$ $d$ and is connected to the draw-hook $e$ of the vehicle $f$.

$g$ is a link-carrier jointed to the outer end of the outer link $d$ of the coupling-chain (herein called the "coupling-link") and provided at the rear side with two slotted portions $g'$ $g'$.

$c$ is the intermediate link of the coupling-chain.

$h$ is a transverse shaft, (herein called the "lifting-shaft,") which is mounted in bearings $j$, fixed to the end of the vehicle, and is provided with a lifting-crank $i$, which loosely engages with the slotted portions $g'$ of the link-carrier $g$.

$k$ is a hollow rock-shaft, (herein called the "reversing-shaft,") which is mounted upon an inner transverse operating-shaft $m$, carried by the bearings $j$.

$n$ is a reversing-lever fixed to the reversing-shaft and connected to the lower end of the link-carrier $g$ through a connecting-rod $o$, that is jointed to the said link-carrier and is arranged to slide through a cross-pin $p$ on the reversing-lever $n$ and is provided with stops $o'$ and $o^2$, arranged at opposite sides of the pin $p$.

The support $a$ consists of a link like a shackle-link, the inner end of which is split and may be jointed to lugs $q$, formed on a plate $r$, fixed to the end of the vehicle and through which the inward extension of the draw-hook $e$ works. The outer end of the said link $a$ is arranged to project into the path of the lifting-crank $i$, so as to be raised and supported thereby when the lifting-shaft $h$ is operated for coupling or uncoupling. The draw-hook $e$ is formed with a slot $s$ and hole $t$, as heretofore usual, for the reception of the inner end of the inner link $b$ of the coupling-chain, and the top of the draw-hook $e$ is formed with a recess or seat $u$ for supporting the coupling-link $d$ and link-carrier $g$, which are prevented from accidentally leaving the said seat by a projection $u'$.

The coupling-link $d$ is made square-ended at its outer end, and the link-carrier $g$ is made of fork shape and jointed at its upper end to the sides of the coupling-link, near the outer end thereof, by studs or projections $v$ on the link-carrier entering corresponding holes in the coupling-link. The upper end of the link-carrier $g$ is provided with a detachable cross-piece $g^2$, that forms a movable extension of the link-carrier and extends over the end of the coupling-link $d$ and which is mounted to turn to a limited extent upon the studs or projections $v$. The arrangement is such that in the event of the link-carrier $g$ and coupling-link $d$ falling into their lowest inclined and uncoupled positions these parts will then be held by the lifting-crank $i$ and reversing-lever $n$ and their corresponding shafts $h$ and $k$ and a stop 2, hereinafter referred to, in such positions that the upper end of the link-carrier $g$, formed by the cross-piece $g^2$, will be above the bottom of the highest draw-hook $e$ with which it may come in contact and be then moved upward thereby, and thus prevent the coupling-link $d$ from passing below and fouling such draw-hook, and when the coupling-link is lifted into engagement with such draw-hook the link-carrier $g$ can fall sufficiently to allow of its top cross portion $g^2$ entering the hook and seating itself on the top of the coupling-link $d$ therein, so as not to foul any part of the draw-hook, and can accommodate itself to any working condition assumed by the coupling-link $d$ in the said draw-hook. The slotted portions $g'$ of the link-carrier $g$ are formed by two bent bars, fixed to the inner side of the slotted lever and adapted to bear on the lifting-crank $i$, which is adapted to provide a wide base or bearing for the link-carrier and is centrally arranged on the lifting-shaft $h$, the ends $h'$ of which are bent at right angles, or nearly so, to the length of the shaft to form the supporting-arms hereinbefore referred to.

The slotting of the lower portion of the link-carrier $g$ at $g'$ is an important feature, as it enables the said link-carrier to move upward independently of the lifting-crank $i$ to a small extent during a part of the time the coupling-link is being lifted clear of the draw-hook, and it also allows of relative movement of the adjacent parts of the lifting-crank and link-carrier when the connection between two vehicles becomes lengthened by the yielding of the draw-springs of the vehicles. The slotting of the link-carrier also permits of free lateral movement of the coupling-link—as, for instance, when adjacent vehicles are on a curve or otherwise out of a direct line.

The reversing-lever $n$ is simply an arm fixed upon the hollow reversing-shaft $k$, which is mounted to turn on the inner operating-shaft $m$, which is adapted to be suitably connected to the reversing-shaft $k$, so as to enable this shaft to be rotated by it in either direction. In the example the two ends of the hollow reversing-shaft $k$ are formed with segmental notches 1 1$^a$, into which, respectively, take projections 2 2$^a$. The projection 2 is fixed to the adjacent bearing $j$ and acts as a stop to limit the backward movement of the reversing-lever $n$ and hold it in the position shown in Fig. 1. The other projection—viz., 2$^a$—is fixed to the operating-shaft $m$ and is adapted by partly rotating such shaft in either direction to engage one or other end of the notch 1ᵃ and rotate the hollow reversing-shaft $k$ and reversing-lever $n$ in a forward or backward direction.

The ends of the operating-shaft $m$ are provided with weighted operating arms or handles 3, (hereinafter called "weighted arms,") that are normally held in their forward position, Figs. 1, 2, and 3, so as to hold the reversing-lever $n$ in its extreme rearward position, but which when moved backward past their mid-position act to move the reversing-lever $n$ forward and cause the automatic uncoupling of two coupled vehicles to take place when the same are moved toward one another.

The means for holding the lifting-crank $i$ in the raised position, into which it is moved through the link-carrier $g$ by the pull on the coupling-chain when starting two coupled vehicles, may be brought into action by backward movement of the operating-shaft $m$. The release of the lifting-shaft $h$ may be effected by the backward movement of the coupling-link $d$ and link-carrier $g$ when automatic uncoupling takes place, or by the backward movement of one or other, or both, of the buffer-heads 4 on the vehicle $d$ to which the coupling apparatus is applied, or by both of these means combined, the necessary extent of backward movement of the vehicles for uncoupling being governed by the length of the coupling-chain used.

In the example the lifting-shaft $h$ with lifting-crank $i$ is arranged to be held up by a weighted pawl 5, pivoted at one side of the vehicle and adapted to engage with a ratchet wheel or segment 6, that is formed in one piece with one of two stop-lifting devices 7, that are mounted to turn about the end portions of the lifting-shaft $h$ inside the supporting-arms $h'$. When the weighted arms 3 are in their forward position, Fig. 1, the pawl 5 is held out of engagement with its ratchet-segment 6 by a cam $m'$ on the corresponding end of the operating-shaft $m$; but when the weighted arms are moved into their backward position, Fig. 5, the cam $m'$ is moved into its forward position and allows the weighted pawl 5 to engage with its ratchet-segment 6. If desired, there may be a pawl and ratchet-segment at each side of the vehicle, the teeth on one segment being arranged out of line with those on the opposite segment, so as to give the same result as a single segment having teeth of intermediate or divided pitch.

Each of the two stops for holding the coupling apparatus in position for automatic coupling comprises, according to the arrangement shown, a bar 8, that is jointed at its outer end 8ᵃ to the back of the buffer-head 4 and extends backwardly through a vertically-slotted guide 10, carried by the buffer-case 4ᵃ. Each stop-lifting device 7 in the example comprises a plate mounted to turn around the lifting-shaft $h$ and adapted by friction or otherwise to be held in the position into which it is raised and then released. For this purpose each plate may, as in the example, be bent upon itself, so as to fit over the adjacent bearing $j$ and tightly fit the same when moved into its raised position. Each stop-lifting device is provided with two lateral projections 11 and 12, between which the corresponding supporting-arm $h'$ on the said lifting-shaft $h$ extends, and is adapted to be turned in an upward and inward direction by a hand-lever 13, that is mounted to turn freely upon the corresponding end portion of the said lifting-shaft $h$ and is provided with a lateral projection 13ᵃ, which when the said hand-lever is turned upward is caused to abut against the adjacent supporting-arm $h'$ and turn the lifting-shaft $h$ and lifting-crank $i$ in an upward direction to an extent that is limited by an extension 13ᵇ of the lever coming against the stop 14. Each supporting-arm $h'$ when raised abuts against the projection 11 on the adjacent stop-lifting device 7 and raises such device. The two projections 11 and 12 on each stop-lifting device 7 are so arranged and the corresponding stop 14 is normally so located that the supporting-arms $h'$ can only be raised by either hand-lever 13 sufficiently to lift and slip past the pivoted stops 8, but will not raise the stop-lifting devices 7 sufficiently high to bring the projections 12 thereon into position to hold the stops 8 in the raised position, so that the said pivoted stops 8 after being raised by the supporting-arms $h'$ will fall in front of such arms and act to prevent them and the lifting-shaft $h$ turning downward when the hand-lever 13 is released. Each supporting-arm $h'$ is, however, free to be afterward turned inward to a further extent by inward movement of the stop 8 in contact therewith and through the adjacent projection 11 further raise the corresponding stop-lifting device 7 into a position in which the projection 12 thereon will lift the stop 8 out of engagement with the said supporting-arm $h'$ and itself become held by friction in the position to which it has been raised, so as to leave the said supporting-arm free to fall past the said stop 8, after which it will, by abutting against the said projection 12, move the stop-lifting device 7 downward with it and allow the corresponding stop 8 to resume its normal position. The arrangement is such that if the two vehicles $f$, Fig. 1, to be automatically coupled be on a curve and one of the stops 8 is forced backward by the impact of the buffer-head 4 at one side of one vehicle against that at the corresponding side of the other vehicle, such stop will by acting against the end of the corresponding supporting-arm $h'$ partly rotate such arm in an upward and inward direction, and through the lifting-shaft $h$ will simultaneously rotate the second supporting-arm $h'$ at the opposite side of the vehicle in an upward and inward direction. The two supporting-arms $h'$ in their upward and inward movement will by acting upon the projections 11 on the two stop-lifting devices 7 also turn these devices upward and inward into a position in which the projections 12 thereon will lift both stops 8 and hold them raised, so as to leave both arms $h'$, with the lifting-shaft $h$ and lifting-crank $i$, free to then rotate in a downward direction past the said stops, and thus permit the automatic coupling of the two vehicles to take place, the said arms after moving past the stops abutting against the projections 12, and thereby causing the stop-lifting devices 7 to move down with them. Automatic coupling of the two vehicles will take place in a similar manner when they are brought together on a straight portion of track, except that usually both of the pivoted stops 8 will come into operation simultaneously to rotate the supporting-arms $h'$ and stop-lifting devices 7 to cause automatic coupling to take place.

To enable the coupling-link $d$ and link-carrier $g$ after being moved into position for automatic coupling to be returned to the inoperative position by hand without being previously coupled to another vehicle, the coupling apparatus is so constructed that each lifting-lever 13 can for the purpose mentioned be raised to a greater height than when it is desired to simply move the coupling-link and link-carrier into position for automatic coupling, so that the stop-lifting devices 7 will be caused to raise the pivoted stops 8 and allow the supporting-arms to move downward past them. For this purpose the stop 14 at each side of the vehicle may, as shown to a larger scale in side and end elevation in Figs. 6$^a$ and 6$^b$, respectively, be formed by the pivoted end of an arm 14$^a$, that is jointed to the vehicle at 14$^b$ and is notched or recessed at 14$^c$, the said arm being arranged to project in front of a cam $m^2$, fixed to the adjacent weighted arm 3, or it may be to the operating-shaft $m$. As will be seen, the arrangement is such that when the weighted arms 3 are in the forward position (see full lines in Fig. 6$^a$) each cam $m^2$ will be clear of its pivoted arm 14$^a$, which will then be in a position in which the larger part 14 of its pivoted end will act as a stop to limit the upward-turning movement of the hand-lever 13 to such an extent (see the full lines in Fig. 6$^a$) that the supporting-arms $h'$ can only be caused to slip past the ends of the pivoted stops 8 and then abut against the inner ends thereof, so that the projections 12 on the stop-lifting devices 7 will be lifted to a position just below, but clear of the adjacent pivoted stops 8, and so that the parts will be held in position for automatic coupling, as hereinbefore described; but by turning over the weighted arms 3 into the backward position the cams $m^2$ will lift the pivoted arms 14$^a$, so as to bring the recessed portions 14$^c$ thereof in the path of the extension 13$^b$ of each hand-lever 13 and allow either hand-lever and the lifting-shaft $h$ and stop-lifting devices 7 to be raised to the further extent shown in dotted lines in Fig. 6$^a$, in which the projections 12 on the two stop-lifting devices 7 will have raised the pivoted stops 8, and after the link-carrier $g$ and coupling-link $d$ have been caused by the action of the reversing-lever $n$ to move backward allow the supporting-arms $h'$ to move past them in a downward direction and so enable the coupling apparatus to assume the inoperative position without being previously coupled with an adjacent vehicle.

The working of the coupling apparatus is as follows: Assuming one or other of the hand-levers 13 to have been lifted and the various parts of the apparatus to have been thereby brought into and held by the stops 8 in the positions shown in Figs. 1 and 2 for automatic coupling, then upon the vehicles being brought forcibly together, so that the coupling-link $d$ of the one vehicle comes over the draw-hook $e$ of the other vehicle and the buffers 4 are pushed inward, the stops 8, or one of them, will by acting against the supporting-arm $h'$, or one of such arms, cause the stop-lifting devices 7 to move into a position to cause the projections 12 thereon to lift the stops 8 and release the supporting-arms $h'$, lifting-shaft $h$, lifting-crank $i$, and link-carrier $g$, so as to allow the coupling-link $d$ to fall and automatically engage with the draw-hook $e$ on the adjacent vehicle, as hereinbefore described, whether the vehicles be on a straight portion of track or on a curved portion and whether the buffers are at the same height or at different heights, the various parts finally assuming the position shown in Fig. 3, when the coupled vehicles pull one on the other, the lifting-crank $i$ being then in its lowered position in the slotted portions $g'$ of the link-carrier $g$, the reversing-crank $n$ in its rearward position, and the pawl 5 held out of engagement with its toothed segment 6. When automatic coupling thus takes place, the coupling-link $d$ and link-carrier $g$ will be supported by the draw-hook $e$ of the adjacent vehicle, the upper end of slotted portions $g'$ of the link-carrier $g$ being held above and out of contact with the lifting-crank $i$, so that the said coupling-link will be held in engagement with the draw-hook by its weight, together with that of the link-carrier, and be further secured by the action of the weighted arms 3. With the parts in the coupled position (shown in Fig. 3) accidental uncoupling of the two vehicles is rendered impossible, even when the draw-hook $e$, engaged with coupling-link $d$, is in its lowest working position. This will be evident from Fig. 4, which shows the positions of the various parts when the vehicles are moved partly toward each other (see dotted lines) and also when the buffers are forced fully home, (see the full lines,) the said figure also showing by the dotted line P the path in which the center of the joint between the coupling-link $d$ and link-carrier $g$ moves. It will be seen that this path is below the top of the draw-hook $e$, so that the coupling-link $d$ cannot slip over such hook. To enable the two coupled vehicles to become automatically uncoupled when this is desired, the weighted arms 3 on the lifting-shaft $h$ are turned upward and inward over the center of such shaft into the position shown at $3^a$ in Fig. 5, in which they tend to turn the reversing-shaft $k$ and lever $n$ in a direction to move the link-carrier $g$ and coupling-link $d$ through the rod $o$ into the backward and inoperative position, and thereby cause the outer end of the coupling-link $d$ to bear against the inner face $e'$ of the coupling-hook $e$. At the same time the backward movement of the weighted arms 3 moves the cam $m'$ away from the pawl 5 and allows this pawl to engage in the toothed segment 6, and thus hold the same and the lifting-shaft $h$ and lifting-crank $i$ (through the projection 12 on the lifting device 7 and the supporting-arm $h'$) in the positions into which they have been moved by the link-carrier $g$ when the coupling-chain is pulled tight, as in Fig. 3, the lifting-crank $i$ then becoming a fixed fulcrum about which the link-carrier $g$ can turn. Upon then moving one vehicle backward toward the other sufficiently to release the strain on the coupling-chain the weighted arms 3 will fall successively into the positions shown by the center lines $3^b$, $3^c$, and by acting upon the lower end of the link-carrier $g$ through the operating-shaft $h$, reversing-shaft $k$, reversing-lever $n$, and rod $o$ will cause the end of the coupling-link $d$ to first slide up the face $e'$ of the draw-hook $e$, with which it is engaged, until it rises into a position over the point of the draw-hook, as shown in Fig. 5, after which the link-carrier $g$, turning upon the lifting-crank $i$ as a fulcrum, will move backward into a position—say that represented by the dotted line $g^3$—the weighted arms 3 falling into the position shown by the center line $3^c$ and the rod $o$ sliding through the pin $p$ on the reversing-lever $n$ until its tappet $o^2$, under the action of the weight of the coupling-chain and attached parts, strikes the pin $p$ and through the reversing-shaft $h$ assists the weighted arms 3 to cause the cam $m'$ to knock the pawl 5 out of engagement with the segment 6, whereupon the various parts will fall back by gravity into the inoperative position above the draw-hook $e$. (Shown in full lines in Fig. 6.) Upon then moving the weighted arms 3 back into the forward position (see dotted lines in Fig. 6) the parts of the coupling apparatus will fall into their lowest inoperative positions, (shown in dotted lines in Fig. 6,) in which they will be behind the buffer-heads, and therefore in a position in which they will not foul similar apparatus on an adjacent vehicle, and the coupling-link $d$ will rest on the seat $u$ on the draw-hook $e$ and leave this draw-hook free to be engaged with the coupling-link on an adjacent vehicle. Even when the parts are in the position shown in full lines in Fig. 6 should the lower end of the link-carrier $g$ foul other apparatus on an adjacent vehicle no damage would result, as the said link-carrier is free to turn about the lifting-crank $i$ against the action of the weighted arms 3, which would yield to allow such turning movement to take place without damage. With the parts in the positions shown in dotted lines in Fig. 6 the apparatus is ready to be again lifted by either hand-lever 13 into the position shown in Fig. 1 for automatic coupling.

The operations of coupling and uncoupling can, when desired, be effected in a non-automatic manner. For non-automatic coupling the lifting shaft $h$ and crank $i$ are while the weighted arms 3 are in their forward position lifted by one of the hand-levers 13 from the position shown in dotted lines in Fig. 6, so as to first lift the coupling-link $d$ off the draw-hook $e$ and then cause the link-carrier $g$ to turn about the lifting-crank $i$ as a center until it has passed a short distance beyond its vertical or mid-position, whereupon the coupling-link and link-carrier will fall forward by gravity over the draw-hook of the adjacent vehicle, with which the coupling-link will be caused to engage when the hand-lever is released. For afterward uncoupling in a non-automatic manner the weighted arms 3 are turned over into their backward position $3^a$, Fig. 5, and the lifting-crank $i$ is again raised by hand, whereby the coupling-link $d$ will be first raised clear of the draw-hook $e$ by the link-carrier $g$, which will then be turned backward about the lifting-crank $i$ as a center by the reversing-lever $n$ under the action of the weighted arms 3, the apparatus finally assuming the position shown in dotted lines in Fig. 6, when the weighted arms 3 are returned to their forward position.

From the foregoing it will be understood that automatic uncoupling of coupled vehicles can be provided for without the necessity of an operator being near the vehicles at the moment when such uncoupling is to be effected, and that the setting of the apparatus for automatic coupling or uncoupling and also the coupling and uncoupling in a non-automatic manner can be effected by one hand.

Coupling apparatus of the kind hereinbefore described can be variously modified. For example, instead of using a coupling-link $d$, having a squared outer end, as in Figs. 1 to 6, inclusive, an ordinary coupling-link having a rounded outer end may be used, as shown in Figs. 7, 8, and 9. In this case the coupling-link $d$ is held in a cradle or holder 15, that is of suitable section—for example, channel-section—and jointed at its outer end to the studs $v$ at the outer end of the link-carrier $g$, a flange 16 on the cross-piece $g^2$, pivoted on the studs $v$, serving to confine the coupling-link in the cradle. In each case the cross-piece $g^2$ may, as shown in dotted lines in Fig. 9, be provided at each side with a pair of lateral extensions $15^a$, that project beyond the sides of the link-carrier $g$, and through which a pin $15^b$ is passed, so as to prevent any possibility of the outer end of the said link-carrier opening and becoming accidentally disengaged from the coupling-link $g$ or its cradle 15.

The top of an existing draw-hook may, as shown in Fig. 10, be provided with a seat like $u$, formed on a separate plate $u^2$, attached to the draw-hook, or the upper open end of the slot $s$ in such hook may be enlarged, as shown at $s'$ in Fig. 12, to serve as a seat for the link, and in each case the ordinary hole $t$ in the draw-hook may be enlarged sufficiently in a backward and downward direction (see Fig. 12) to admit of the inner end of the inner link $b$ moving into a position in which it will allow of the coupling-link $d$ assuming a position in which its outer end will take up a position of repose on the seat $u$ or in the upper end of the slots.

The stop 2 for holding the reversing-lever $n$ in its backward position instead of being formed on one of the bearings $j$ may be attached directly to or form an extension of any convenient part of the vehicle. It may, for example, be formed by a cross-piece, (shown in dotted lines at $j'$ in Fig. 2,) as connecting the lower ends of the plates $j^2$, that are fixed to the end of the vehicle and carry the central pair of bearings $j$. Also the hollow shaft $k$, carrying the reversing-lever $n$, may be made quite short, so as to form merely a hollow boss for the said reversing-lever.

Each stop 8 may, as shown in Fig. 10, be provided at its under side with a wedge-shaped part $8^b$, so arranged that when the said stop is forced backward by the corresponding buffer 4 it will be tilted upward about its jointed end $8^a$ as a center by contact of the said wedge-shaped part $8^b$ with the lower part of the slotted guide 10. By this means the corresponding supporting-arm $h'$ will be released by a shorter backward movement of the buffer than with the construction shown in Figs. 1 to 6, inclusive, or each stop 8 may, as shown in Fig. 11, be recessed at its under side and formed with an inclined surface $8^c$ for a like purpose. Again, each stop-lifting device 7 instead of being provided with a lateral projection 12, arranged to work under the slotted guide 14, as in Figs. 1 to 6, inclusive, may, as shown in Figs. 12 and 13, be provided with a bent lateral extension $12^a$, arranged to work through the slotted lower end of the guide 10 and effect an early release of the arm $h'$. The projection 12, Figs. 1 to 6, may be variously arranged to effect an early lift of the adjacent stop 8 and an early release of the lifting-shaft $h$ and attached parts without slotting the lower end of the guide 10.

Instead of causing the automatic coupling of two vehicles to take place by the inward movement of one or other, or both, of the buffer-heads 4, as hereinbefore described, such automatic coupling of two vehicles can, in cases where the buffer-rods extend through the head-stock of the vehicle, be controlled by the inward movement of the inner ends of the buffer-rods. For this purpose the lifting-shaft $h$ is adapted to be held in the raised position necessary for supporting the slotted link-carrier $g$ and coupling-link $b$ in position for automatic coupling by a holding device that is mounted on a suitable support on the end of the vehicle and is adapted to be moved into a position to release the lifting-shaft and enable automatic coupling to take place by disengaging mechanism, the action of which is controlled by or is dependent upon the inward movement of the inner end of either of the two buffer-rods of the vehicle. The arrangement is such that when the lifting-shaft is raised into position to bring the link-carrier and coupling-link into position for automatic coupling the holding device will come automatically into action to hold the lifting-shaft in its raised position, and upon either or both of the buffer-rods being forced inward by contact with one or other, or both, of the buffers on another vehicle the disengaging mechanism will automatically act to withdraw the holding device, so as to release the lifting-shaft and allow the same, with link-carrier and coupling-link, to fall and enable automatic coupling of the two vehicles to take place. With this arrangement the supporting-arms $h'$, the pivoted stops 8 on the buffer-heads 4, the stop-lifting devices 7, and the adjustable stops $14^a$ $14^c$ for the lifting-handles 13 $13^b$ used in the coupling apparatus hereinbefore described can be dispensed with and the construction and working of such coupling apparatus improved.

Figs. 14, 15, and 16 show one construction of the modified coupling apparatus above referred to. The lifting-shaft $h$, with lifting-crank $i$, is mounted in bearings 17, carried by vertical angle-irons 15 16, that are fixed to the corresponding end of the vehicle and the lower ends of which or some of which also serve as bearings for the reversing or operating shaft $m$. The ends of the lifting-shaft $h$ are provided with lifting-handles 13, one of which may be formed in one piece with such shaft and the other of which is secured thereto in a detachable manner and is provided with an arm 20, carrying a lateral projection 21. Fixed to the ends of a transverse rock-shaft 22, mounted in bearings 23 on the end of the vehicle, are two downwardly-extending arms 24, that are normally forced in a forward direction against a stop or stops by a weighted arm 25, attached to one of them, as shown, and thus to the rock-shaft 22, and one of which is provided on its front side with a tooth or projection 26, hereinafter called for distinction the "holding-tooth," that is adapted to take behind the lateral projection 21 when either lifting-handle 13 is raised sufficiently and to then hold the lifting-shaft $h$ in the raised position. To each arm 24 is connected, by a pin-and-slot connection 27 28, the forward end of a connecting-rod 29, the rear end of which is fixed to the lower free end of a bar 30, that is carried by a spring 31 and is located between a buffer-spring seat 32, attached to the inner end of the corresponding buffer-rod $4^b$, and a bearing-plate 33 at the inner side of the head-stock 34 of the vehicle. In the example the bar 30 and spring 31 are shown as formed in one piece, as a bent spring-blade, one end of which is free and the other is fixed at 35 to the head-stock 34. The arrangement is such that normally—that is to say, when the buffer-rods $4^b$ are in their outer position—the bent spring-blades 30 31 will be compressed by the spring-seats 32, so that the connecting-rods 29 will then be held in their forward position, in which the slots 28 therein will permit the arms 24 to occupy, under the action of the weighted arm 25, their forward position, in which the holding-tooth 26 on one of them will be in the path of the lateral projection 21 on the arm 20, so that when the lifting-shaft $h$ is being raised by either handle 13 into position to allow of automatic coupling the said lateral projection 21 will descend and push back the holding-tooth 26 and attached arms 24 against the action of the weighted arm 25 until it has slipped past the said holding-tooth, which will then return and act through the said projection to hold the lifting-shaft in the raised position until one or both of the buffers on the vehicle is or are brought forcibly into contact with one or both of the buffers on another vehicle, whereupon one or both of the buffer-rods $4^b$ will be forced inward, so as to relieve one or both of the spring-blades 30 31 of pressure and permit the free end of one or each of these blades to move rearward, and by pulling on one or each of the depending arms 24 withdraw the holding-tooth 26 from the lateral projection 21 on the lever-arm 20 and allow this shaft and attached parts to fall and enable automatic coupling to take place. To enable the holding-tooth 26 to be moved backward to release the lateral projection 21 and raised lifting-shaft $h$ without automatic coupling having taken place, one or each of the depending arms 24 may bear against a lateral sleeve-like extension or boss $3^a$ of the adjacent weighted arm 3 on the operating-shaft $m$, which is formed with a cam-like part $3^b$, or is otherwise so formed that it is adapted by turning the said weighted arm 3 upward and backward to a small extent to force the adjacent depending arm 24 backward and so disengage the holding-tooth 26 from the lateral projection 21. When it is desired that this modified construction of coupling apparatus shall be capable of being set to effect the automatic uncoupling of two coupled vehicles, as hereinbefore described, the lever-arm 20, in addition to carrying the lateral projection 21, is formed at its periphery with a segmental rack 6, with which a weighted pawl 5 will be caused to automatically engage, as in the coupling apparatus hereinbefore described, after the weighted arms 3 on the shaft $m$ have been turned into their backward position and the lifting-shaft $h$ and lifting-handles 13 have been automatically raised to a sufficient extent by exerting a pull on the coupling-chain connecting two vehicles, the pawl 5 then acting, as before, to hold the lifting-shaft in its raised position. The lateral projection 21 is so arranged on the carrying-arm 20 that it will not be depressed sufficiently by the automatic raising of the lifting-shaft $h$, caused by the pull on the coupling-chain, to slip past and be held by the holding-tooth 26. The weighted pawl 5 may be mounted to turn freely on the rock-shaft 22 and be held in its rearward position, with the detent thereon clear of the rack 6, by the boss $3^a$ of the adjacent weighted arm 3, the said boss being cut away at $3^c$ or otherwise so formed as to allow the said pawl to move forward when the said weighted arm is turned into its rearward position. The bearings 17 for the lifting-shaft $h$ may conveniently be formed by bent metal plates fixed to the vertical angle-irons 15 16 at the end of the vehicle, and rearward extensions of some of the bent plates may be used as the bearings 23 for to the rock-shaft 22.

Figs. 17, 18, and 19 show a modified construction of coupling apparatus of the kind last described. In this case the two depending arms 24 in the previous arrangement are replaced by two upwardly-extending arms $24^a$, that are fixed to upwardly-extending lugs or flanges 36 on the bosses $3^a$ of the two weighted arms 3, fixed to the operating or reversing shaft $m$. One of the said upwardly-extending arms $24^a$ is formed with a holding-tooth $26^a$, adapted to engage with a notched lateral projection $21^a$ on the arm 20 of the adjacent lifting-handle 13, and each of them is provided at the top with a tooth or projection $27^a$, that extends upward through a slot 28 in the forward end of a connecting-rod 29, the rear end of which is connected to the free end of a bent spring-blade 30 31, arranged and operating as in the other construction of coupling apparatus last hereinbefore described. The connecting-rod 29 may be connected to the part 31 of the spring-blade by a joint that will enable it to lift, but not to fall, from the position shown. In this modified arrangement when the weighted arms 3 are in their forward position and either of the lifting-handles 13 is lifted sufficiently the notched projection $21^a$ will descend and move back the holding-tooth $26^a$ against the action of the said weighted arms 3, which will cause the said tooth to engage with and hold the notched projection $21^a$ and attached parts in position for automatic coupling when the said projection has slipped below the tooth. When either buffer-rod $4^b$ is forced inward, the corresponding bent spring-blade 30 31 will expand rearward, as before, and cause the connecting-rod 29 attached thereto to pull back the upwardly-extending lever-arm $24^a$, with which it is engaged, and disengage the holding-tooth $26^a$ from the notched projection $21^a$, either directly or indirectly, through the operating or reversing shaft *m*, according to which buffer-rod 4ª is forced inward, and so release the lifting-shaft *h* and allow automatic coupling to take place. When the weighted arms 3 are moved into their backward position for automatic uncoupling, the upwardly-extending arms 24ª connected thereto are disengaged from the slotted connecting-rods 29 and are then inoperative. For automatic uncoupling the arm 20 is, as in the last-described arrangement, formed with a segmental rack 6 for engagement at the required time with a weighted pawl 5, that may be pivoted to a rearward extension 23 of one of the bearings 17 for the lifting-shaft.

As will be obvious, in lieu of the bent spring-blades 30 31, hereinbefore described, various other means may be used for operating the connecting-rods 29 and arms 24 with holding-tooth 26 when one or each of the buffer-rods 4ᵇ is forced inward. For example, each bent spring-blade may be replaced by a rigid rod similar to 30, carried by an india-rubber spring 37, (see Fig. 18ª,) that is normally compressed by the action of the buffer-spring acting against the seat 32, so that energy will be stored in it for effecting the disengagement of the holding-tooth 26 from the lateral projection when the buffer-rod is forced inward.

Figure 21:
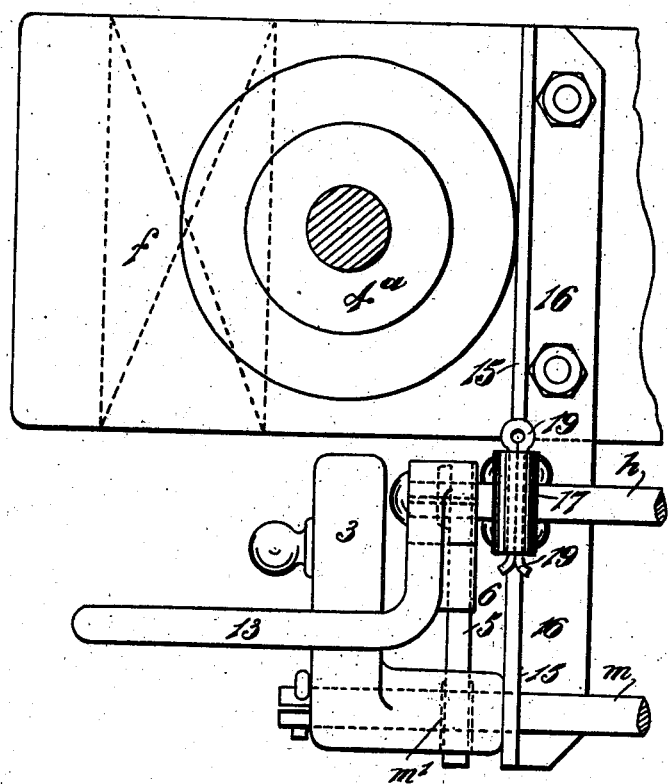

When it is desired to provide only for automatic uncoupling and non-automatic coupling and uncoupling, the coupling apparatus can be constructed as indicated by Figs. 20 and 21. In this case the mechanism hereinbefore described for holding the lifting-shaft in the raised position and for releasing such shaft when either of the buffers is forced inward is dispensed with and each lifting-handle 13 is fixed to the lifting-shaft, one of such handles having fixed to it an arm 20, with toothed segment 6, as in Figs. 14 to 19, for engagement with the weighted pawl 5, as hereinbefore described. The bearings for the shaft *m* may, as in Figs. 14 to 19, be formed in angle-irons 15 16, fixed to the end of the vehicle *f*, and the bearings for the lifting-shaft *h* in bent metal plates 17, secured to opposite sides of the flange 15 of the said angle-irons. Slots 18 may be cut in the adjacent parts of each bearing-plate 17 to admit of the lifting-shaft *h* being dropped in position from above, and the top of each slot may be closed by a pin 19, formed by bending a piece of sheet metal upon itself, as shown, so as to form a rounded head that rests upon the slotted upper portion of the bent plate 17, and a split shank portion which is bifurcated, so as to extend down on opposite sides of the lifting-shaft *h* and has its free ends bent outward, as shown in Fig. 21, to prevent it leaving its place. This modified apparatus operates in the manner hereinbefore described for automatic uncoupling and for non-automatic coupling and uncoupling.

When it is desired to provide only for non-automatic coupling and uncoupling, the coupling apparatus can be still further simplified, as indicated by Figs. 22 and 23. In this case the toothed segment 6, cam *m'*, and weighted pawl 5 (hsown in Figs. 20 and 21) are also dispensed with, and the lifting-handles 13 are or may be formed in one piece with the lifting-shaft *h* and crank *i* and be threaded through the bent bearing-plates 17. This modified apparatus operates in the manner hereinbefore described for non-automatic coupling and uncoupling. The lower or outer side of the coupling-link *d* or the corresponding side of the link-carrier *g* or link-holder 15 may in each case be provided with diverging and outwardly-extending flanges to facilitate coupling on curves. In Fig. 2 the coupling-link is for the purpose mentioned flanged, as shown at *d'*. When the link-carrier *g* is provided with a top cross-piece $g^2$, as and for the purpose hereinbefore described, such cross-piece may, as shown at 15ᶜ in Figs. 7, 8, and 9, be curved or angled on its forward or engaging side for a similar purpose.

Any suitable means may be provided for enabling the coupling apparatus to readily part or become disconnected from the coupling-link *d* when subjected to undue strain, and so avoid wrecking thereof in the event of the breaking of any link of the coupling-chain connecting two vehicles. For this purpose the lower ends of the slotted parts *g'* in the link-carrier *g* may, as shown, be formed as spring-bars bent inward at the lower end, so as to be capable of readily opening outward when subjected to strain and releasing the lifting-crank *i*, and the free end $o^2$ of the connecting-rod *o* may be adapted to pull clear of the reversing-arm *n*; also, the forward end $o^3$ of the rod *o* may be bent around the lower end of the link-carrier, so that it can when necessary open out and release the carrier and part of the coupling-chain to which it is connected.

A railway-vehicle provided with coupling apparatus of the kind hereinbefore described can be used with other railway-vehicles, whether the same be provided with similar coupling apparatus or only with the ordinary coupling-chains.

Having now particularly described and ascertained the nature of the said invention and in what manner the same is to be performed, I declare that what I claim is—

1. In a link-coupler, the combination with the buffers, the draw-hook, and the coupling-chain; of means for supporting the outer link in a position to receive therein the draw-hook of an adjacent vehicle; means actuated by the movement of one or both of the buffers for causing said supporting means to cause said outer link to engage the hook of the adjacent car; and means actuated on the loosing of the coupling-chain for causing the supporting means to raise the outer link from engagement with the draw-hook of the adjacent vehicle.

2. In a link-coupler, the combination with the buffers, and the coupling-chain; of a draw-hook having a notch in its upper edge between its hook portion and the vehicle; of means for supporting the outer link in a position to receive therein the draw-hook of an adjacent vehicle; means actuated on the loosening of the coupling-chain for causing the supporting means to raise the outer link from engagement with the draw-hook of the adjacent vehicle, and place the link in the said notch portion of the draw-hook.

3. In a link-coupler, the combination with the buffers, the draw-hook, and the coupling-chain; of a lifting-shaft arranged to be operated from either side of the vehicle; a link-carrier having the outer link of the coupling-chain connected therewith; a crank on said shaft connected with the link-carrier at an intermediate portion of the latter; a reversing-shaft; a lever on said latter shaft; and a connecting-rod attached to the free end of said latter lever, and connected to the lower extremity of the link-carrier.

4. In a link-coupler, the combination with the buffers, the draw-hook, and the coupling-chain; of a lifting-shaft arranged to be operated on either side of the vehicle; a link-carrier having one extremity connected with the outer link of the coupling-chain; a crank on said shaft connected with the link-carrier at an intermediate portion of the latter by a slotted joint; a reversing-shaft; a lever on said latter shaft; and a connecting-rod having one end connected with the lower end of the link-carrier, and having its other end loosely connected with the free end of said lever.

5. In a link-coupler, the combination with the buffers, the draw-hook, and the coupling-chain; of a lifting-shaft arranged to be operated from either side of the vehicle; a link-carrier having the outer link of the coupling-chain connected therewith; a crank on said shaft connected with the link-carrier at an intermediate portion of the latter; a reversing-shaft; a lever on said latter shaft; a connecting-rod attached to the free end of said latter lever, and connected to the lower extremity of the link-carrier; and a U-shaped support pivoted to the draw-hook below the inner link of the coupling-chain and arranged to rest on the said crank and support said inner link.

6. In railway coupling apparatus, the combination with a vehicle, a draw-hook thereon, and a coupling-chain jointed to said draw-hook, of an upwardly-extending link-carrier having its upper end jointed to the outer link of said chain near to the outer end thereof and adapted to move said coupling-link onto and from said draw-hook, a lifting-crank whereon said link-carrier is loosely mounted to turn, means for operating said lifting-crank from either side of said vehicle, and means connected to the lower end of said link-carrier and whereby said link-carrier can be turned about said lifting-crank as a center.

7. In railway coupling apparatus, the combination with a vehicle, a draw-hook thereon, and a coupling-chain jointed to said draw-hook, of a slotted link-carrier jointed at its upper end to the other link of said chain near to the outer end thereof, and capable of moving said outer link onto and from said draw-hook, separate transverse lifting and reversing shafts mounted to turn on the end of said vehicle and capable of being operated from either side thereof, a lifting-crank capable of being turned about a horizontal axis from said lifting-shaft and wherein said slotted link-carrier is mounted to turn, a reversing-lever capable of being turned about a horizontal axis by movement of said reversing-shaft, and a connecting-rod jointed to the lower end of said link-carrier and to said reversing-lever, and capable of moving endwise to a limited extent relatively to said reversing-lever, and of being moved endwise by said lever, substantially as described for the purpose specified.

8. In railway coupling apparatus, the combination with a vehicle, a draw-hook thereon, and a coupling-chain jointed to said draw-hook, of separate transverse lifting and reversing shafts mounted to turn on said vehicle and each capable of being operated from either side thereof, a lifting-crank fixed to said lifting-shaft, a reversing-lever mounted on said reversing-shaft and capable of being operated thereby, a slotted link-carrier loosely mounted on said lifting-crank and jointed at its upper end to the outer link of said chain near to the outer end thereof and capable of moving said outer link onto and from said draw-hook and a connecting-rod jointed to the lower end of said link-carrier and to said reversing-lever, capable of moving endwise on said lever to a limited extent, and of being moved endwise by said lever.

9. In railway coupling apparatus, the combination with a vehicle, a draw-hook thereon, and a coupling-chain jointed to said draw-hook, of separate transverse lifting and reversing shafts mounted to turn on said vehicle and capable of being turned from either side thereof, a lifting-crank capable of being lifted by said lifting-shaft, a reversing-shaft mounted to turn to a limited extent on said reversing-shaft and of being moved in a forward direction by said shaft, a stop arranged to limit backward movement of said reversing-lever, a slotted link-carrier loosely mounted on said lifting-crank jointed at its upper end to the outer link of said chain, and capable of turning about a horizontal axis, and a connecting-rod jointed to the lower end of said link-carrier and to said reversing-lever and capable of endwise movement to a limited extent on said lever.

10. In railway coupling apparatus, the combination with a vehicle, a draw-hook thereon, and a coupling-chain jointed to said draw-hook, of separate lifting and reversing shafts mounted to turn on said vehicle, a lifting-crank fixed to said lifting-shaft, a reversing-lever on said reversing-shaft and capable of being operated thereby a stop to limit backward motion of said reversing-lever, an upwardly-extending link-carrier jointed at its intermediate portion to said lifting-crank, and at its upper end to the outer link of said chain, and a connecting-rod between the lower end of said link-carrier and said reversing-lever.

11. In railway coupling apparatus, the combination with a vehicle, a draw-hook thereon, and a coupling-chain jointed to said draw-hook, of transverse lifting and reversing shafts $h$ and $m$, respectively mounted to turn on said vehicle, a lifting-crank $i$, fixed to said lifting-shaft $h$, a reversing-lever $n$, mounted to turn on said reversing-shaft said shaft when turned in one direction being adapted to turn said reversing-lever in a forward direction and when turned in the opposite direction to move said reversing-lever in a backward direction, a link-carrier $g$, having its upper end jointed to the outer link of said chain so as to suspend the same from points near to the outer end thereof and provided with a slotted intermediate portion $g'$, loosely mounted on said lifting-crank, and a connecting-rod $o$, jointed to the lower end of said link-carrier and to said reversing-lever and capable of sliding endwise on said lever to an extent limited by stops $o'$ $o^2$ on said rod, substantially as described for the purposes specified.

12. In railway coupling apparatus, the combination with a vehicle, a draw-hook thereon, and a coupling-chain jointed to said draw-hook, of separate transverse lifting and reversing shafts mounted to turn on said vehicle and capable of being operated from either side thereof, a lifting-crank capable of being operated from said lifting-shaft, a reversing-lever capable of being operated from said reversing-shaft, an upwardly-extending slotted link-carrier loosely mounted on said lifting-crank and jointed at its upper end to the outer link of said coupling-chain, a connecting-rod connecting said reversing-lever to the lower end of said link-carrier, and a top cross-piece jointed to the upper end of said link-carrier and arranged to extend over the outer end of said outer chain-link, substantially as described for the purpose specified.

13. In railway coupling apparatus, the combination with a vehicle, a draw-hook thereon, and a coupling-chain jointed to said draw-hook, of separate transverse lifting and reversing shafts mounted to turn on said vehicle and capable of being operated from either side thereof, a lifting-crank capable of being operated from said lifting-shaft, a reversing-lever capable of being operated from said reversing-shaft, a cradle or holder for the outer link of said chain, an upwardly-extending slotted link-carrier loosely mounted on said lifting-crank and jointed at its upper end to the outer end of said cradle or holder near to the outer end of said outer link, and a connecting-rod jointed to the lower end of said link-carrier and to said reversing-lever, substantially as described.

14. In railway coupling apparatus, the combination with a vehicle, a draw-hook thereon, and a coupling-chain jointed to said draw-hook, of transverse lifting and reversing shafts mounted to turn on said vehicle and capable of being separately operated from either side thereof, a lifting-crank capable of being turned by said lifting-shaft, a reversing-lever capable of being turned by said reversing-shaft, an upwardly-extending slotted link-carrier loosely mounted at its intermediate portion to turn upon said lifting-crank, jointed at its upper end to the outer link of said chain and capable of moving said link onto and from said draw-hook, a connecting-rod between the lower end of said link-carrier and said reversing-lever, and means adapted to support said lifting-shaft, crank, slotted lever and coupling-chain in position for automatic coupling.

15. In railway coupling apparatus, the combination with a vehicle, a draw-hook thereon, and a coupling-chain jointed to said draw-hook, of transverse lifting and reversing shafts mounted to turn on said vehicle and capable of being separately operated from either side thereof, a lifting-crank capable of being turned by said lifting-shaft, a reversing-lever capable of being turned by said reversing-shaft, an upwardly-extending slotted link-carrier loosely mounted at its intermediate portion to turn upon said lifting-crank, jointed at its upper end to the outer link of said chain and capable of moving said link onto and from said draw-hook, a connecting-rod between the lower end of said link-carrier and said reversing-lever, means adapted to support said lifting-shaft and the parts carried thereby in position for automatic coupling, and means adapted on said vehicle coming into contact with another vehicle to release said supporting-shaft and attached parts and permit automatic coupling to take place.

16. In railway coupling apparatus, the combination with a vehicle provided with endwise-movable buffers, with a draw-hook, and a coupling-chain jointed to said draw-hook, of transverse lifting and reversing shafts mounted to turn on said vehicle and capable of being separately operated from either side thereof, a lifting-crank capable of being turned by said lifting-shaft, a reversing-lever capable of being turned by said reversing-shaft, an upwardly-extending slotted link-carrier loosely mounted at its intermediate portion to turn upon said lifting-crank, jointed at its upper end to the outer link of said chain and capable of moving said link onto and from said draw-hook, a connecting-rod between the lower end of said link-carrier and said reversing-lever, holding means adapted to support said lifting-shaft and the parts carried thereby in position for automatic coupling, and means controlled by said buffers and adapted to cause said holding means to release said lifting-shaft and attached parts by inward movement of either buffer and permit automatic coupling to take place.

17. In railway coupling apparatus, the combination with a vehicle provided with endwise-movable buffers, with a draw-hook, and a coupling-chain jointed to said draw-hook, of operating apparatus capable of being operated from either side of the vehicle and to bring the outer coupling-link of said chain in position for automatic coupling, holding means adapted to support said operating apparatus and coupling-link in position for automatic coupling, and means controlled by the inner end of each buffer-rod and adapted on either of the buffer-rods being forced inward to cause said holding means to release said lifting-shaft and attached parts and permit automatic coupling to take place.

18. In railway coupling apparatus, the combination with a vehicle provided with endwise-movable buffers, with a draw-hook, and a coupling-chain jointed to said draw-hook, of transverse lifting and reversing shafts mounted to turn on said vehicle and capable of being separately operated from either side thereof, a lifting-crank capable of being turned by said lifting-shaft, a reversing-lever capable of being turned by said reversing-shaft, an upwardly-extending slotted link-carrier loosely mounted at its intermediate portion to turn upon said lifting-crank, jointed at its upper end to the outer link of said chain and capable of moving said link onto and from said draw-hook, a connecting-rod between the lower end of said link-carrier and said reversing-lever, holding means adapted to support said lifting-shaft and the parts carried thereby in position for automatic coupling, and means controlled by the inner end of each buffer-rod and adapted on either buffer-rod being forced inward to cause said holding means to release said lifting-shaft and attached parts and permit automatic coupling to take place.

19. In railway coupling apparatus, the combination with a vehicle provided with endwise-movable buffers, with a draw-hook, and a coupling-chain jointed to said draw-hook, of transverse lifting and reversing shafts mounted to turn on said vehicle and capable of being separately operated from either side thereof, a lifting-crank capable of being turned by said lifting-shaft, a reversing-lever capable of being turned by said reversing-shaft, an upwardly-extending slotted link-carrier loosely mounted at its intermediate portion to turn upon said lifting-crank, jointed at its upper end to the outer link of said chain and capable of moving said link onto and from said draw-hook, a connecting-rod between the lower end of said link-carrier and said reversing-lever, holding means adapted to support said lifting-shaft and the parts carried thereby in position for automatic coupling, and means adapted to move said holding means into a position to release said lifting-shaft arranged to be normally held out of action by said buffer-rods but to act when either buffer-rod is pushed inward.

20. In railway coupling apparatus, the combination with a vehicle provided with endwise-movable buffers, a draw-hook, and a coupling-chain jointed to said hook, of transverse lifting and reversing shafts mounted on said vehicle and capable of being operated from either side thereof, a lifting-crank operated by said lifting-shaft, a reversing-lever operated by said reversing-shaft, a link-carrier mounted at an intermediate part of its length on said lifting-crank and connected at its upper end to the outer link of said chain, a connecting-rod between the lower end of said link-carrier and reversing-lever, a projection in connection with said lifting-shaft, two connected arms mounted on said vehicle and one of which is provided with a holding-tooth adapted to engage said projection and hold the lifting-crank in the raised position for automatic coupling after it has been moved into that position, and operating devices normally held in an inoperative position by the inner ends of the buffer-rods but each adapted when released by inward motion of either buffer-rod to automatically move and operate both arms and cause the holding-tooth to release said projection and lifting-shaft.

21. In railway coupling apparatus, the combination with a vehicle provided with endwise-movable buffers, a draw-hook, and a coupling-chain jointed to said hook, of transverse lifting and reversing shafts mounted on said vehicle and capable of being operated from either side thereof, a lifting-crank operated by said lifting-shaft, a reversing-lever operated by said reversing-shaft, a link-carrier mounted at an intermediate part of its length on said lifting-crank and connected at its upper end to the outer link of said chain, a connecting-rod between the lower end of said link-carrier and reversing-lever, a projection in connection with said lifting-shaft, two connected arms mounted on said vehicle and one of which is provided with a holding-tooth adapted to engage said projection and hold the lifting-crank in the raised position for automatic coupling after it has been moved into that position, two rods each adapted when moved backward to engage one of said connected arms and move it and the other arm and the holding-tooth into a position to release the projection connected to said lifting-shaft, and spring devices each adapted, when released, to move one of said rods into its operative position but normally held out of action by the forward thrust of the corresponding buffer-rod.

22. In railway coupling apparatus, the combination with a vehicle provided with endwise-movable buffers, a draw-hook, and a coupling-chain jointed to said hook, of transverse lifting and reversing shafts mounted on said vehicle and capable of being operated from either side thereof, a lifting-crank operated by said lifting-shaft, a reversing-lever operated by said reversing-shaft, a link-carrier mounted at an intermediate part of its length on said lifting-crank and connected at its upper end to the outer link of said chain, a connecting-rod between the lower end of said link-carrier and reversing-lever, a projection in connection with said lifting-shaft, a cross-shaft mounted on said vehicle, two arms fixed on said cross-shaft, one of which is provided with a holding-tooth, and both of which are normally pressed in a forward direction to bring said holding-tooth into a position to engage said projection and hold said lifting-crank in the raised position, connecting-rods adapted to engage said arms and move them backward, and spring-operated devices that are normally acted upon by the inner ends of the buffer-rods and hold said connecting-rods in their forward and inoperative positions but each of which will act to move back the corresponding connecting-rod and arm and withdraw said holding-tooth from said projection when the corresponding buffer-rod is forced inward.

23. In railway coupling apparatus, the combination with a vehicle provided with endwise-movable buffers, a draw-hook, and a coupling-chain jointed to said hook, of transverse lifting and reversing shafts mounted on said vehicle and capable of being operated from either side thereof a lifting-crank operated by said lifting-shaft, a reversing-lever operated by said reversing-shaft, a link-carrier mounted at an intermediate part of its length on said lifting-crank and connected at its upper end to the outer link of said chain, a connecting-rod between the lower end of said link-carrier and reversing-lever, a projection in connection with said lifting-shaft, a cross-shaft mounted on said vehicle and provided with forwardly-extending weighted arms, two upwardly-extending arms fixed to said cross-shaft and one of which is provided with a forwardly-extending holding-tooth adapted to engage with said projection and hold the lifting-shaft in the raised position when the same is lifted into that position, two rods each adapted to engage the upper end of one of said arms each connected to one of said rods, each spring-actuated arm and rod being normally held in the forward and inoperative position by the inner end of the corresponding buffer-rod but adapted to automatically move backward and actuate said connected arms and withdraw said holding-tooth from said projection, when the corresponding buffer-rod is forced inward.

24. In railway coupling apparatus, the combination with a vehicle provided with a draw-hook, a coupling-chain jointed thereto, and buffers having rods extending through the head-stock of the vehicle to the inner side thereof, of a transverse lifting-shaft mounted on said vehicle and provided at its central portion with a lifting-crank and at its ends with lifting-handles one of which is provided with a lateral projection $21^a$, a transverse reversing-shaft mounted on said vehicle and provided at its central portion with a reversing-lever and at its ends with weighted arms that normally extend in a forward direction, a slotted link-carrier mounted to turn on said lifting-crank and jointed at its upper end to the outer link of said chain, a connecting-rod between the lower end of said link-carrier and reversing-lever, upwardly-extending arms $24^a$ fixed to said transverse shaft and one of which is provided with a holding-tooth $26^a$ adapted to engage with said lateral projection, slotted connected rods 29 engaging the upper ends of said arms $24^a$, and spring-carriers 30, carried by said vehicle and each connected to one of said rods and arranged between the head-stock of the vehicle and an enlarged part of the inner end of the corresponding buffer-rod and normally compressed thereby, substantially as described for the purpose specified.

25. In railway coupling apparatus, the combination with a vehicle, a draw-hook thereon and a coupling-chain connected to said draw-hook, of transverse lifting and reversing shafts mounted on said vehicle and capable of being operated from either side thereof, a lifting-crank, capable of being operated by said lifting-shaft, a reversing-lever capable of being operated by said reversing-shaft, a stop to limit backward movement of said reversing-lever, a slotted link-carrier mounted to turn on said lifting-crank, jointed at its upper end to the outer link of said chain, and adapted to move said outer link from over said draw-hook to a position over the draw-hook of an adjacent vehicle and vice versa, a connecting-rod jointed to the lower end of said link-carrier and to said reversing-lever and capable of endwise motion, to a limited extent, relatively to said reversing-lever and of being operated by said reversing-lever, holding means adapted, when released, to hold said lifting-crank in the raised position into which it will be moved by said link-carrier when said chain is coupled to another vehicle and a pull is exerted thereon, and means whereby said reversing shaft and lever can be caused to exert a thrust on said connecting-rod that will tend to move the lower end of said link-carrier outward and the upper end thereof inward, substantially as described for the purpose specified.

26. In railway coupling apparatus, the combination with a vehicle, a draw-hook thereon, and a coupling-chain connected to said draw-hook, of transverse lifting and reversing shafts mounted on said vehicle and capable of being operated from either side thereof, a lifting-crank capable of being operated by said lifting-shaft, a reversing-lever capable of being operated by said reversing-shaft, a stop to limit backward movement of said reversing-lever, a slotted link-carrier mounted to turn on said lifting-crank, jointed at its upper end to the outer link of said chain, and adapted to move said outer link from over said draw-hook to a position over the draw-hook of an adjacent vehicle and vice versa, a connecting-rod jointed to the lower end of said link-carrier and to said reversing-lever and capable of endwise motion, to a limited extent, relatively to said reversing-lever and of being operated by said reversing-lever, holding means adapted, when released, to hold said lifting-crank in the raised position into which it will be moved by said link-carrier when said chain is coupled to another vehicle and a pull is exerted thereon, weighted arms fixed to said reversing-shaft and adapted when moved into a backward position to cause said reversing-lever to exert a forward thrust on said connecting-rod, and means carried by said reversing-shaft and adapted when said arms are turned into the backward position to release said holding means and allow the same to come into operation, and means for automatically disengaging said holding means from said lifting-crank when the coupling-chain falls back into its inoperative position.

27. In railway coupling apparatus, the combination with a vehicle, a draw-hook thereon, and a coupling-chain connected to said draw-hook, of transverse lifting and reversing shafts mounted on said vehicle and capable of being operated from either side thereof, a lifting-crank capable of being operated by said lifting-shaft, a reversing-lever capable of being operated by said reversing-shaft, a stop to limit backward movement of said reversing-lever, a slotted link-carrier mounted to turn on said lifting-crank, jointed at its upper end to the outer link of said chain, and adapted to move said outer link from over said draw-hook to a position over the draw-hook of an adjacent vehicle and vice versa, a connecting-rod jointed to the lower end of said link-carrier and to said reversing-lever and capable of endwise motion, to a limited extent, relatively to said reversing-lever and of being operated by said reversing-lever, holding means adapted when said reversing-lever is turned into a forward position to hold said lifting-crank in the raised position into which it will be moved by said link-carrier when said chain is coupled to another vehicle and a pull is exerted thereon, a weighted arm fixed to said reversing-shaft and adapted when moved into a backward position to cause said reversing-lever to exert a forward thrust on said connecting-rod, and a cam carried by said reversing-shaft and adapted when said reversing-lever is moved forward, by said connecting-rod, under the action of said link-carrier and chain, to disengage said holding means from said lifting-crank, substantially as described for the purpose specified.

28. In railway coupling apparatus, the combination with a vehicle, a draw-hook thereon, and a coupling-chain connected to said draw-hook, of transverse lifting and reversing shafts mounted on said vehicle and capable of being operated from either side thereof, a lifting-crank capable of being operated by said lifting-shaft, a reversing-lever capable of being operated by said reversing-shaft, a stop to limit backward movement of said reversing-lever, a slotted link-carrier mounted to turn on said lifting-crank, jointed at its upper end to the outer link of said chain, and adapted to move said outer link from over said draw-hook to a position over the draw-hook of an adjacent vehicle and vice versa, a connecting-rod jointed to the lower end of said link-carrier and to said reversing-lever and capable of endwise motion, to a limited extent, relatively to said reversing-lever, and of being operated by said reversing-lever, a weighted arm fixed to said reversing-shaft and adapted when moved into a backward position to cause said reversing-lever to exert a forward thrust on said connecting-rod and the lower end of said link-carrier, a toothed segment connected to said lifting-shaft, a pawl pivoted to said vehicle and adapted, when said weighted arm is turned into its backward position, to engage said toothed segment and hold the lifting-crank in the raised position into which it will be moved by said link-carrier when said chain is coupled to another vehicle and a pull is exerted thereon, and a cam-like projection carried by said reversing-shaft and adapted, when said reversing-lever is moved forward to a further extent by a pull of said connecting-rod, caused by automatic turning movement of said link-carrier, to force said pawl out of engagement with said segment, substantially as described for the purpose specified.

Signed at 77 Cornhill, in the city of London, England, this 1st day of March, 1902.

WILLIAM RICHARD SUMPTION JONES.

Witnesses:
  WM. B. BROWN,
  HUGH HUGHES.